United States Patent [19]

Taylor et al.

[11] Patent Number: 4,594,366
[45] Date of Patent: Jun. 10, 1986

[54] CONNECTED BRANCHED POLYOLS AND POLYURETHANES BASED THEREON

[75] Inventors: Glenn A. Taylor, South Charleston; Kenneth L. Hoy, Saint Albans, both of W. Va.

[73] Assignee: Union Carbide Corporation, Danbury, Conn.

[21] Appl. No.: 679,611

[22] Filed: Dec. 7, 1984

Related U.S. Application Data

[63] Continuation-in-part of Ser. No. 562,453, Dec. 20, 1983, abandoned, which is a continuation of Ser. No. 509,089, Jun. 29, 1983, abandoned.

[51] Int. Cl.$^4$ .................... C08G 18/14; C08G 18/64; C08K 5/05
[52] U.S. Cl. .................... 521/137; 252/182; 523/400; 524/198; 524/310; 524/377; 524/504; 524/565; 524/566; 524/567; 524/568; 524/569; 524/575; 524/728; 524/760; 524/762; 528/75
[58] Field of Search ............... 524/377, 762; 523/400

[56] References Cited

U.S. PATENT DOCUMENTS

| | | | |
|---|---|---|---|
| Re. 28,715 | 2/1976 | Stamberger | 260/33.2 |
| Re. 29,014 | 10/1976 | Pizzini et al. | 260/33.2 |
| Re. 29,118 | 1/1977 | Stamberger | 260/2.5 |
| 1,922,459 | 8/1933 | Schmidt et al. | 260/106 |
| 1,970,578 | 8/1934 | Schoeller et al. | 260/98 |
| 1,990,615 | 2/1935 | Rodrian et al. | |
| 2,174,762 | 10/1939 | Schuette et al. | 260/458 |
| 2,432,148 | 12/1947 | Furness et al. | 260/48 |
| 2,450,079 | 9/1948 | Brown | 260/10.6 |
| 2,527,970 | 10/1950 | Sokol | 260/615 |
| 2,552,528 | 5/1951 | DeGroote | 252/331 |
| 2,562,878 | 8/1951 | Blair | 252/340 |
| 2,602,051 | 7/1952 | Groote | 252/331 |
| 2,605,232 | 7/1952 | DeGroote | 252/340 |
| 2,606,162 | 8/1952 | Coffey et al. | 260/22 |
| 2,657,181 | 10/1953 | Van Horn et al. | 252/73 |
| 2,673,882 | 3/1954 | Griffin | 260/615 |
| 2,674,619 | 4/1954 | Lundsted | 260/485 |
| 2,677,700 | 4/1954 | Jackson | 260/488 |
| 2,679,521 | 5/1954 | DeGroote | 260/475 |
| 2,692,873 | 10/1954 | Langerak et al. | 260/77.5 |
| 2,692,874 | 10/1954 | Langerak | 260/77.5 |
| 2,692,877 | 10/1954 | Gray et al. | 260/229 |
| 2,706,207 | 4/1955 | Schnell et al. | 260/615 |
| 2,726,219 | 12/1955 | Hill | 260/2.5 |
| 2,768,141 | 10/1956 | Langer et al. | 252/73 |
| 2,771,471 | 11/1956 | DeGroote | 260/347.4 |
| 2,777,831 | 1/1957 | Seeger et al. | 260/75 |
| 2,801,648 | 8/1957 | Anderson et al. | 138/74 |
| 2,801,990 | 8/1957 | Seeger et al. | 260/75 |
| 2,814,606 | 11/1957 | Stilmar | 260/42 |
| 2,834,748 | 5/1958 | Bailey et al. | 260/42 |
| 2,888,409 | 5/1959 | Bender et al. | 260/2.5 |
| 2,917,480 | 12/1959 | Bailey et al. | 260/42 |
| 2,927,918 | 3/1960 | Anderson | 260/209 |
| 2,946,767 | 7/1960 | Basel | 260/47 |
| 3,304,273 | 2/1967 | Stamberger | 260/2.5 |
| 3,383,351 | 5/1968 | Stamberger | 260/33.2 |
| 3,652,639 | 3/1972 | Pizzini et al. | 260/465.4 |
| 3,655,553 | 4/1972 | DeWald | 252/1 |
| 3,823,201 | 7/1974 | Pizzini et al. | 260/861 |
| 3,850,861 | 11/1974 | Fabris et al. | 260/2.5 BE |
| 3,950,317 | 4/1976 | Patton et al. | 260/88.3 A |
| 3,953,393 | 4/1976 | Ramlow et al. | 260/31.8 R |
| 4,104,236 | 8/1978 | Simroth | 260/33.2 R |
| 4,119,586 | 10/1978 | Shah | 521/137 |
| 4,148,840 | 4/1979 | Shah | 260/859 R |
| 4,172,825 | 10/1979 | Shook et al. | 524/377 |
| 4,198,488 | 4/1980 | Drake et al. | 521/137 |
| 4,208,314 | 6/1980 | Priest et al. | 260/33.2 R |
| 4,242,249 | 12/1980 | Van Cleve et al. | 260/33.2 R |
| 4,327,005 | 4/1982 | Ramlow et al. | 524/377 |
| 4,357,430 | 11/1982 | Van Cleve et al. | 521/128 |
| 4,431,754 | 2/1984 | Hoffman | 524/762 |
| 4,452,923 | 6/1984 | Carroll et al. | 524/377 |
| 4,463,107 | 7/1984 | Simroth et al. | 524/377 |

FOREIGN PATENT DOCUMENTS

| | | |
|---|---|---|
| 735010 | 5/1966 | Canada . |
| 785835 | 5/1968 | Canada . |
| 837677 | 3/1970 | Canada . |
| 0001789 | 6/1979 | European Pat. Off. . |
| 1152536 | 8/1963 | Fed. Rep. of Germany . |
| 1152537 | 8/1963 | Fed. Rep. of Germany . |
| 2457725 | 6/1976 | Fed. Rep. of Germany . |
| 2457727 | 6/1976 | Fed. Rep. of Germany . |
| 858127 | 1/1961 | United Kingdom . |
| 866323 | 4/1961 | United Kingdom . |
| 666324 | 4/1961 | United Kingdom . |
| 867461 | 5/1961 | United Kingdom . |
| 1022434 | 3/1966 | United Kingdom . |
| 1239701 | 7/1971 | United Kingdom . |
| 1321679 | 6/1973 | United Kingdom . |

OTHER PUBLICATIONS

E. F. Cluff and E. K. Gladding, "Relation of Structure to Properties in Polyurethane", *Journal of Applied Polymer Science*, 3:9, 290 (1960).

H. J. Fabris, "High Resilience Polyurethane Foams", *Advances in Urethane Science and Technology*, 3, 106 (1974).

C. G. Seefried, Jr., R. D. Whitman and D. F. Pollart, "Influence of Polymer Structure on High Resiliency Urethane Foams", *Journal of Cellular Plastics*, 10, 171 (1974).

(List continued on next page.)

*Primary Examiner*—Herbert S. Cockeram
*Attorney, Agent, or Firm*—P. W. Leuzzi

[57] ABSTRACT

Connected branch polyols comprising a core segment having a defined molecular weight, one core branch unit directly connected to each end of the core segment, at least one additional branch unit at each end connected directly or indirectly to each core branch unit, and linear polymer segments connected to the branch units are utilized in preparing a wide spectrum of polymer/polyols characterized by superior dispersion stability and viscosity to solids content relationship, the polymer/polyols in turn being employed to prepare polyurethanes having superior performance in flame retardancy tests.

52 Claims, No Drawings

OTHER PUBLICATIONS

K. G. Spitler and J. J. Lindsey, "PHD Polyols, A New Class of PUR Raw Materials", *Journal of Cellular Plastics*, 43–49, Jan.–Feb., 1981.

J. H. Saunders and K. C. Frisch, "Polyurethanes—Chemistry and Technology" (Interscience Publishers, New York, 1962), pp. 36–37, 349.

N. Grassie and J. N. Hay, "Thermal Coloration and Insolubilization in Polyacrylonitrile", *Journal of Polymer Science*, 56, 189 (1962).

A. S. Hoffman and R. Bacskai, "Block and Graft Copolymerizations", Copolymerization, (Interscience Publishers, New York, 1964), pp. 335–420.

W. C. Kuryla and R. D. Whitman, "Polyurethane Elastomers from Post-Grafted Polymer-Polyol Systems", *Journal of Applied Polymer Science*, 11, 133 (1967).

W. C. Kuryla, F. E. Critchfield, L. W. Platt and P. Stamberger, "Polymer/Polyols, A New Class of Polyurethane Intermediates", *Journal of Cellular Plastics*, 2, 84 (1966).

CONNECTED BRANCHED POLYOLS AND POLYURETHANES BASED THEREON

RELATED APPLICATION

This application is a continuation-in-part of prior U.S. application Ser. No. 562,453, filing date Dec. 20, 1983, abandoned, which is a continuation of application Ser. No. 509,089, filing date June 29, 1983, abandoned.

Meschke and Hoy, Ser. No. 468,670, filed Feb. 22, 1983, for: Connected Branch Copolymers And Method For Their Production.

BACKGROUND OF THE INVENTION

1. Field Of The Invention

This invention relates to novel polyols, to polymer/polyols utilizing such polyols and to polyurethanes prepared from such polymer/polyols.

2. Description Of The Prior Art

Polymer/polyol compositions suitable for use in producing polyurethane foams, elastomers and the like are known materials. Such compositions can be produced by polymerizing one or more ethylenically unsaturated monomers dissolved or dispersed in a polyol in the presence of a free radical catalyst. These polymer/polyol compositions have the valuable property of imparting to, for example, polyurethane foams and elastomers produced therefrom, higher load-bearing properties than are provided by the corresponding unmodified polyols.

There are a number of prior disclosures relating to production of polymer/polyol compositions. The basic patents in the field are Stamberger U.S. Pat. Re. No. 28,715 (reissue of U.S. Pat. No. 3,383,351) and U.S. Pat. Re. No. 29,118 (reissue of U.S. Pat. No. 3,304,273). Other prior disclosures include: British Pat. No. 1,126,025; Scharf et al. Canadian Pat. No. 735,010; Kuryla Canadian Pat. No. 785,835; Pizzini et al. U.S. Pat. No. 3,652,639; Pizzini et al. U.S. Pat. Re. No. 29,014 (reissue of U.S. Pat. No. 3,823,201); Patton, Jr., et al. U.S. Pat. No. 3,950,317; Ramlow et al. U.S. Pat. No. 3,953,393; DeWald U.S. Pat. No. 3,655,553; Fabris et al. U.S. Pat. No. 3,850,861; Priest et al. U.S. Pat. No. 4,208,314; Simroth U.S. Pat. No. 4,104,236; Shah U.S. Pat. No. 4,148,840; Shah U.S. Pat. No. 4,119,586; Shook et al. U.S. Pat. No. 4,172,825; Drake et al. U.S. Pat. No. 4,198,488; Preston et al. U.S. Pat. No. 4,198,488; Japanese Pat. No. 48-101494; Japanese Pat. No. 52-80919/75;and Van Cleve et al. U.S. Pat. No. 4,357,430.

The polymer/polyol compositions that found initial commercial acceptance were primarily compositions produced using acrylonitrile. Such compositions were somewhat higher in viscosity than desired in some applications. Further, such compositions were at least primarily used commercially in producing foams under conditions such that the heat generated during foaming is readily dissipated (e.g.—the foams have a relatively thin cross-section) or under conditions such that relatively little heat is generated during foaming. When polyurethane foams were produced under conditions such that the heat generated during foaming was not readily dissipated, severe foam scorching usually resulted. Later, polymer/polyol compositions produced from acrylonitrile-methylmethacrylate monomer mixtures were commercialized and were convertible to polyurethane foams having reduced scorch.

More recently, polymer/polyol compositions produced from acrylonitrile-styrene monomer mixtures have been used commercially. Use of low ratios of acrylonitrile-to-styrene in the monomer mixture affords polymer/polyols that do not give rise to a scorch problem. But it is increasingly difficult to make satisfactorily stable polymer/polyols as the ratio of acrylonitrile to styrene is reduced to the desired levels, particularly at high polymer contents.

The development of sophisticated, high speed and large volume equipment, machines and systems for handling, mixing and reacting polyurethane-forming ingredients has created the need for highly stable polymer/polyols. At one time, there was not much concern for the seediness, viscosity or filterability of polymer/polyols in actual commercial practice. However, the state of the art of polyurethane production has now advanced to the point where these considerations are very important in many applications. There is now much concern with filterability, seediness, and viscosity; and polymer/polyols must meet certain minimum requirements in order to be capable of being processed in the sophisticated foam equipment now used. Typically, the prime requirement is that the polymer/polyols possess sufficiently small particles so that filters, pumps and the like do not become plugged or fouled in relatively short periods of time.

While somewhat simplified, the commercial processability of a particular polymer/polyol comes down to its viscosity and stability against phase separation. Lower viscosities are of substantial practical and economic significance due to the ease of pumping and metering as well as ease of mixing during the formation of polyurethanes. Stability is a prime consideration in insuring that the polymer/polyols can be processed in commercial production equipment without the necessity of additional mixing to insure uniformity.

In addition to the monomer ratio in acrylonitrile-styrene polymer/polyols, other recognized factors that affect product stability include polyol molecular weight and polymer content.

In producing polymer/polyols for use in certain polyurethane elastomer applications, relatively low molecular weight polyols are typically utilized to provide the requisite product stiffness. However, it has been found that it is increasingly difficult to make satisfactorily stable polymer/polyols as the molecular weight of the polyol is decreased.

Still other applications could desirably utilize polyurethane foams and elastomers with even higher load-bearing characteristics than can be currently provided using available polymer/polyols. However, it has been found that it is increasingly difficult to make satisfactory dispersion stable polymer/polyols as the amount of polymer is increased.

U.S. Pat. No. 4,208,314 to Priest et al. discloses low viscosity polymer/polyols made from acrylonitrile-styrene monomer mixtures. These polymer/polyols can be converted to low density, water blown polyurethane foams having reduced scorch, especially when the acrylonitrile to styrene ratio is relatively low. The Priest et al. patent also provides a process for making polymer/polyols whereby the particulate nature of the product is considerably improved, compared to polymer/polyols prepared by prior processes. Using prior procedures, such as the one disclosed in Canadian Pat. No. 735,010, polymer/polyols formed from such monomer mixtures usually contained excessive amounts of large granules. The improved process provided by Priest et al. includes, in general, maintaining a low monomer concentration throughout the reaction mixture during the polymerization.

U.S. Pat. No. 4,104,236 to Simroth discloses a substantial further improvement in forming polymer/polyols made from acrylonitrile/styrene monomer mixtures, which enables selection of the polymer content to provide a polymer/polyol having satisfactory stability when a polyol of given molecular weight and a monomer mixture having a ratio of acrylonitrile to styrene within a certain range are used. The Simroth patent also highlights the fact that satisfactory product stability is not obtained when many combinations of otherwise desirable composition parameters are used.

U.S. Pat. No. 4,172,825 to Shook et al. discloses further improvements in the formation of polymer/polyols. As discussed therein, polymer/polyol compositions exhibiting outstanding properties can be made by utilizing a specific type of peroxide catalyst, namely t-alkyl peroxyester catalysts. By utilizing this specific type of catalyst, polymer/polyols can be produced on a commercial basis which have outstanding properties, such as filterability in processing, yet which allow either the polymer or the styrene content to be increased. Also, polymer/polyols can be produced on a commercial scale with polyols having a molecular weight lower than had been used prior to this invention.

A further improvement in the formation of polymer/polyols is provided by U.S. Pat. No. 4,148,840 to Shah, which discloses a process for producing highly stable and filterable polymer/polyol compositions by polymerizing the monomer or monomers in situ in a polyol mixture that includes a minor amount of preformed polymer/polyol.

Yet another improvement is disclosed in U.S. Pat. No. 4,119,586 to Shah, which discloses a process for producing highly stable polymer/polyol compositions by polymerizing the monomer or monomers in situ in a polyol mixture that includes a major amount of a low molecular weight polyol and a minor amount of high molecular weight polyol.

U.S. Pat. No. 4,242,249 to VanCleve et al. discloses yet another approach to producing stable polymer/polyols in cases where the composition parameters are such that conventional processes would not usually afford a stable product. In the process disclosed by this patent, the monomer mixture is polymerized in a polyol that contains a minor amount of a preformed stabilizer that is tailored to the monomer mixture used. The stabilizer is a copolymer comprised of an anchor portion that is a polymer of the monomer mixture, and a solvatable portion consisting of a propylene oxide polymer having a number average molecular weight of at least about 800.

It has been recognized that the stability of polymer/polyols requires the presence of a minor amount of a graft or addition copolymer which is formed in situ from the monomer and polyol. Some prior approaches have thus been directed to the deliberate incorporation of amounts of unsaturation to the polyol in addition to that inherently present in the polyoxyalkylene polyols typically used in forming polymer/polyols in the belief that improved stability will result due to an increased amount of an addition copolymer stabilizer expected to be formed. U.S. Pat. Nos. 3,652,639, 3,823,201, and 3,850,861, British Pat. No. 1,126,025, and Japanese Pat. Nos. 52-80919 and 48-101494 all utilize this approach.

U.S. Pat. No. 3,850,861 thus discloses the in situ polymerization of ethylenically unsaturated monomers in an unsaturated polyol. Suitable polyols are prepared by using an ethylenically unsaturated polyhydric initiator to form a polyalkylene oxide. The examples set forth include dibasic acids or their derivatives, such as maleic acid. The polyol polymerization medium contains one mole of unsaturation per mole of polyol.

U.S. Pat. No. 3,652,639 likewise discloses the in situ polymerization of ethylenically unsaturated monomers in an ethylenically unsaturated polyol medium. The unsaturated polyols of this patent are produced in a manner similar to those of U.S. Pat. No. 3,823,201, as will be discussed hereinafter, except that the level of unsaturation is higher, being on the order of 1 to 3 moles of unsaturation per mole of polyol.

U.S. Pat. No. 3,823,201 discloses a method of preparing a polymer/polyol by the in situ polymerization of ethylenically unsaturated monomers in a polyol having from 0.1 to 0.7 mole of unsaturation per mole of polyol. Unsaturation at the levels set forth in the U.S. Pat. No. 3,652,639 patent were indicated as imparting unnecessarily high viscosities to the resulting polymer/polyols. The unsaturation level that is added can be introduced into the polyol by, for example, reacting it with an ethylenically unsaturated compound that is capable of adding to the polyol by reaction with the hydroxyl group, such as maleic anhydride. The polymer/polyols disclosed in U.S. Pat. No. 3,823,201 are asserted to be highly stable due to the presence of the stabilizing species which is formed via the grafting (i.e.—by copolymerization) of vinyl polymer chain segments to the unsaturated polyol molecules. Certain improvements in polyurethanes using such polymer/polyols are likewise asserted. More particularly, it is stated that such polymer/polyols are surprisingly superior to those prepared from polyols having high unsaturation in regard to their low viscosities. It is further stated that polyurethane foams prepared from these graft copolymers exhibit superior load-bearing properties.

British Pat. No. 1,126,025 discloses in situ polymerization of ethylenically unsaturated monomers in a polyol having a molecular weight from 250 to 10,000, preferably from 300 to 7,000, and containing at least 0.7 double bonds per molecule. It is stated that suitable unsaturated polyols can be made by including unsaturated compounds such as unsaturated polyhydric alcohols, polycarboxylic acids, or epoxides in the reaction mixture when the polyol is formed, but that it is preferred to introduce the unsaturation by reacting a preformed polyol with an unsaturated epoxide, e.g., allyl glycidyl ether.

Japanese Pat. No. 52-80919 discloses products that are said to be useful in preparation of polyurethanes which are produced by polymerizing unsaturated polyether-esters, or copolymerizing an unsaturated polyether-ester with a vinyl monomer. The unsaturated polyether-ester is prepared by reacting a polyol having a molecular weight of 1,000, to 30,000 with a mixture of saturated and unsaturated dicarboxylic acids. It is stated that the mole ratio of saturated dicarboxylic acid to unsaturated dicarboxylic acid should be from 95/5 to 50/50 to control polymerization. In the Examples, the products are described as being homogeneous and stable.

Japanese Pat. No. 48-101494 discloses in situ polymerization of ethylenically unsaturated monomers in modified polyether polyols obtained by reacting a polyether polyol first with an unsaturated dicarboxylic acid anhydride in an amount more than 0.2 mole per mole of polyol, and then with an epoxy compound, preferably an alkylene oxide, in an amount of preferably 1.1 to 1.5 moles per mole of unsaturated dicarboxylic acid anhydride.

A further approach to production of polymer/polyols is disclosed in U.S. Pat. No. 4,198,488 to Drake et al. In the process disclosed in this patent, the monomer mixture that is polymerized in the polyol includes a minor amount of an ethylenically unsaturated dicarboxylic acid anhydride. It was theorized that some graft copolymer is produced in situ when a portion of the dicarboxylic acid anhydride units that have polymerized into the polymer undergo an esterification reaction with the hydroxyl groups of the polyol. And it was further theorized that the graft copolymer formed in this way acts as a stabilizer for the polymer dispersion.

While many of the above techniques relating to polymer/polyol preparation have provided improved and beneficial results, there are certain cases where none of these techniques have provided products which were entirely satisfactory. Thus, for example, in some situations, the use of the blended base polyol approach results in an undue lowering of the hydroxyl number of the blend with a resultant adverse effect upon foam performance. Other approaches, while generally satisfactory, are too expensive for many commercial applications, too complicated, result in color and odor problems or require foam reformulations which can create undue difficulties.

It is highly desirable for low density slab stock foam applications to be able to provide white, virtually scorch-free products. This can be accomplished at foam densities of about 3.0 pounds per cubic foot or so. It may also be possible with existing technology to provide foams with scorch-free characteristics at even lower densities; but, typically, the technology used either requires an economic penalty or results in less than satisfactory foam characteristics. There thus remains the need to provide techniques capable of producing, without substantial economic penalty, white, virtually scorch-free slab stock foams at ever decreasing densities (viz. —1.5 pounds per cubic foot or less) while maintaining satisfactory load-bearing and other foam properties.

Further, some foam applications require quite rigorous combustibility resistance. It is quite difficult with existing technology to provide polymer/polyols that can be employed to prepare foams meeting such requirements. There thus remains an unfilled need to provide technology which can provide satisfactory polymer/polyols, yet satisfy these rigorous combustibility standards.

The copending Meschke et al. application identified herein discloses connected branch copolymers comprising three parts: a basic or starter segment which will be referred to herein for convenience as a "core" segment; branching polymer segments, comprising polymeric entities connected to at least one end of the core segment and which provide sites for further polymerization; and linear polymer segments, which comprise essentially linear polymeric entities connected to the branch polymer at its reactive branching sites. The core segment has a valence of v, wherein v is an integer, and has correspondingly v terminal bonds connected to v polyvalent, non-crosslinked, branching polymer segments. Each branching polymer segment has an average of t terminal bonds, wherein t is greater than about 2, and is connected to a set of linear polymer segments, which have an average of t−1 linear polymer segments per set. There is thereby provided a group of about v (t−1) linear polymer segments wherein the linear polymer segments have substantially similar chain lengths and composition within that group.

Such copolymers provide superior properties such as reduced viscosity at a given molecular weight. More specifically, polyalkylene oxide connected branch copolymers have thus been shown to have lowered viscosities when compared to linear or star polyalkylene oxide polymers of similar molecular weight.

Belgian Pat. No. 845,72 relates to a method of preparing polypropylene glycols with reduced double bond content by the polymerization of propylene oxide in the presence of basic catalyst and optionally of a solvent. It is stated that, by the presence of a relatively small amount of glycidol, one obtains a considerable reduction of the double bond content of the polypropylene glycol, without the terminal hydroxyl group content being modified in a noticeable way.

OBJECTS OF THE INVENTION

It is accordingly a general object of the present invention to provide novel polyols useful in preparing polymer/polyols characterized by satisfactory stability and which could not be readily made by prior techniques.

A further object provides polyols capable of allowing greater processing latitude in the preparation of polymer/polyols. A related object is to provide dispersion stable polymer/polyols capable of being prepared from a broad spectrum of monomer systems so as to better match the characteristics of the polymer/polyol with the requirements of the specific end use.

A still further object of this invention lies in the provision of polymer/polyols characterized by a superior viscosity to total polymer content relationship.

Yet another object of this invention is to allow the capability to provide polymer/polyols which will impart to polyurethanes the desired performance characteristics.

Other objects of this invention will be apparent from the description set forth hereinafter.

SUMMARY OF THE INVENTION

The present invention relates to polymer/polyols made utilizing a sufficient amount of a connected branch polyol to provide the desired stability and to the use of such polymer/polyols in preparing polyurethane products. Such connected branch polyols comprise a core or connector segment having a defined molecular weight, one core branch unit directly connected to each end of said core segment, at least one additional branch unit at each end connected directly or indirectly to said core branch units, the branch units defining a branch unit segment, and linear polymer segments connected to said branch units. As will be discussed more fully hereinafter, such additional branch units may be connected to said core branch units as homopolymers or as random or sequential copolymer segments of such branch units and said linear polymer segments.

Polymer/polyols of widely varying composition may be prepared which provide polyurethanes with performance characteristics that are largely incapable of being achieved using state-of-the-art technology.

DETAILED EMBODIMENT OF THE INVENTION

Connected Branch Polyols

The connected branch polyols of the present invention are, in general, prepared in a sequential fashion as described herein.

The core segment utilized may conceptually comprise any low molecular weight (number average) moiety capable of satisfactory reaction with the branch units selected and possessing satisfactory compatibility for the intended polyurethane application. As to the latter requirement, the core segment should be selected so as to avoid any undue adverse effects upon the performance characteristics desired for the particular application.

The core reactant utilized in forming the core segment may have a linear, a branched or a star configuration. Suitable linear core segments include polyethers. Core reactants providing a star configuration are defined as compounds which contain molecular chains having multiple functional groups covalently bonded through a chain of atoms to a single, central atom or backbone. Examples of such star reactants which contain functional hydroxyl groups are glycerol, pentaerythritol, dipentaerythritol, trimethylolpropane and the like. Such star core reactants may be extended by polymerizing monomers onto each molecular chain to form the core segment.

The preferred core segments are polyoxyalkylene glycol residues, most preferably, polypropylene glycols. The polypropylene glycols are preferred due to their ready availability and known compatability in polyurethane formulations.

The principal requirement for the core segment is that the chain be of sufficient length to insure adequate accessibility of the grafting sites during polymer/polyol preparation. Adequate accessibility is provided when the polymer/polyol prepared is satisfactorily stable.

As illustrative examples, polypropylene glycols having a molecular weight (number average) ranging from about 240 to about 2000 may suitably be used as the core segment. The maximum molecular weight for the core segment will, in general, be dictated by viscosity considerations. More particularly, as the molecular weight of the core segment increases, the viscosity of the connected branch polyol passes through a minimum and then generally increases. No particular improvement in polymer/polyol dispersion stability has been found when utilizing core segments having molecular weights above the minimum set forth herein.

With respect to the branch unit, the monomer utilized should be capable of reacting with the functional groups of the core segment; and, likewise, the functional groups formed should be capable of reacting with the monomers utilized to form the linear segments. Also, as was the case with the core segments, the material utilized for the branch units should not adversely affect to any signficant extent the desired performance characteristics for the particular polyurethane application.

Conceptually, and subject to the previously stated criteria, any non-crosslinking, branching polymerization monomer having functional groups which provide an additional functional group after the monomer has been polymerized may be employed. Stated another way, each branch unit should provide at least one additional reactive site for the linear polymer segment growth. When the branching polymerization monomer is reacted with a core segment, one of the reactive functional groups of the monomer reacts with the complementary reactive functional group in the core segment to produce a branched intermediate having a mono-, di- or polyvalent core segment terminated with non-crosslinking, branch units having at least two branch ends, i.e., sites, defined by the other two reactive sites. These remaining reactive sites provide sites for either reaction with another branching polymerization monomer to add an additional branch unit or for initiating linear segment growth, as described below.

With the requirements set forth herein in mind, any vicinal epoxide having at least one hydroxyl group should be capable of being utilized as the branch unit. It is particularly preferred to employ glycidol as the branch unit (more accurately, the glycidol residue resulting after the various reactions described herein have been carried out) due its availability and reactivity.

In accordance with this invention, there should be at least, on an average, a two-branch unit segment connected to each end of the core segment, preferably at least a three-branch unit segment. From the economic standpoint, it will generally be desired to utilize only the number of branch units necessary to achieve the desired dispersion stability for the polymer/polyol being prepared, as epoxides such as glycidol tend to be relatively expensive in comparison to the other reactants from which the connected branch polyols of this invention are prepared. However, if desired, the number of branch units at each end of the core segment could be as high as 6 or even more.

The branching polymerization monomer may be added to the core segment in a molar ratio of about 2 to about 50 moles, and preferably about 2 to about 20 moles, of branching unit monomer to equivalent of core segment. Since b moles of branching unit monomer provides b+1 branches for each reactive core segment terminal group, the average number of branch units in the branching segment can be defined by the formula:

$$\frac{b+1}{c}$$

wherein b is the number of moles of branching monomer added, and c is the number of reactive functional groups on the core segment. Using this relationship, it is apparent that the branching structure of the branch unit polymer can be controlled by varying the amount of branching unit monomers utilized as well as by selecting core segments with a different number of reactive terminal groups.

Utilization of this approach provides a connected branch polyol with, as is preferred, a relatively high branch density, viz.—defined as the mole fraction of the branching unit monomer in the branch unit segment. It is thus preferred to have a branch density of 1.0. Connected branch polyols of this type have been found to impart superior dispersion stability to polymer/polyols in comparison to connected branch polyols having relatively lower branch densities. However, such lower branch density connected block polyols should provide greater stability in polymer/polyol preparation than is believed capable of being achieved with state-of-the-art technology.

Such lower branch density connected branch polyols may be prepared in either a random or sequential fashion. The sequential route involves adding to the core segment-core branch unit intermediate reaction product identified above first the linear segment reactant and then the branch unit monomer until the connected block polyol has the desired number of total branches. The random route involves adding such intermediate reaction product to a mixture of the linear polymer segment monomer and the branch unit monomer, the proportions of the mixture being selected to provide the desired number of branch units.

The third component of the connected branch polyol structure, the linear polymer segment, is generated by reacting the linear polymer segment monomers onto the reactive sites in the branch units. The linear segment monomer is polymerized onto substantially each branch reactive site to produce sets of linear polymer segments for each branch unit. In this manner, the linear polymer segments polymerized onto each branch reactive site provide branches with substantially similar chain lengths and compositions extending from each branch end. The chain length will depend upon the amount of linear polymer segment monomer added, whereas the composition will depend upon the monomer or mixture of monomers provided during linear polymerization. The term "substantially similar" is based on a statistical average for all connected branch polyol molecules produced.

The linear polymer segment reactant or monomer used may be any compound or mixture which undergoes linear polymerization initiated by reaction with the functional groups of the branch unit. The monomer or monomers used should of course not adversely affect the desired polyurethane properties. Preferred linear segment monomers are the alkylene oxides, most preferably propylene oxide.

The length of the linear segments should be sufficient to provide the viscosity desired for the connected branch polyol as well as adequate stability insofar as the polymer/polyol preparation is concerned. Thus, the conversion of the core segment-core branch unit intermediate to the connected branch polyols of the present invention results in a sharp drop in viscosity. In general, increasing the chain length of the linear segment will decrease the viscosity up to a point, beyond which further increase in chain length will cause a viscosity increase. Similarly, a minimum linear segment chain length is believed necessary to assist in achieving adequate stabilization during polymer/polyol preparation.

The linear segment should accordingly have a molecular weight (number average) of at least about 240, but a linear segment having a molecular weight up to about 4000 or even higher may perhaps be used. Preferably, the molecular weight of the linear segment should be at least about 1000 or so.

It will generally be desirable to select the linear segment chain length in view of the properties desired for the particular polyurethane application. However, for some applications, where it is desired to increase the hard phase content of the resulting polyurethane, the use of relatively short chain lengths should, upon reaction with a diisocyanate, provide an increase in the hard phase content, thereby increasing the load-bearing characteristics.

If desired, and when propylene oxide is used to form the linear segments, the linear segments may be capped with ethylene oxide by conventional techniques to increase the percentage of primary hydroxyl groups. The amount of ethylene oxide to provide the capping may vary as desired, suitable amounts typically varying from about 10 to about 35 percent, based upon the weight of the finished connected branch polyol.

The connected branch polyols of the present invention preferably have a number average molecular weight of from about 8,000 to about 18,000 or so. More preferably, the molecular weight will range from about 10,000 to about 14,000 or so. However, connected branch polyols having molecular weights above and below the ranges set forth may likewise be useful, depending upon the particular end use requirements desired. Useful hydroxyl numbers for the connected branch polyols will range from about 25 to about 150, typically from about 25 to about 70 for flexible foams and from about 70 to about 150 for semi-flexible foams.

Reaction Conditions

Both branching and linear ploymerization reaction steps may be carried out in the presence of suitable adjuvants, solvents, stabilizers, catalysts and other polymerization aids well known to those skilled in the art.

Various catalysts may be utilized in varying amounts, depending upon the type of polymerization being conducted, in particular, upon the factors discussed below. Suitable catalysts include caustic materials, such as alkali or alkaline earth metals or their corresponding hydroxides and alkoxides; Lewis acids; mineral acids, and so on. Selection of specific catalysts is considered to be within the skill of the art. Crown ethers can be used as rate assisting agents.

The amount of catalyst employed during the branching and linear polymerization reaction steps is important for obtaining the desired connected branch copolymers of this invention. The amount of catalyst employed in the branching polymerization reaction step should be a sufficient amount to effect substantially complete reaction of the core reactant with the non-crosslinking, branching polymerization monomer. Likewise, the amount of catalyst employed in the linear polymerization reaction step should be a sufficient amount to effect substantially complete reaction of the branched core compound with the linear polymerization monomer, and to provide an essentially uniform distribution of linear polymerization monomer along each branch of the branched core compound. While not wishing to be bound by any particular theory, there is evidence to believe that the amount of catalyst is dependent upon (1) the total functionality of the non-crosslinking, branching polymerization monomer, (2) the particular core reactant employed in preparing the connected branch copolymers, and (3) the solubility and dissociation properties of the catalyst itself.

The total functionality ratio of the non-crosslinking, branching polymerization monomer, e.g., glycidol, based on the moles of catalyst can be determined according to the following formula:

$$\text{Total Functionality Ratio of Monomer to Catalyst} = \frac{\text{Moles of Monomer} \times \frac{\text{Moles of Monomer}}{\text{Moles of Core}} + \text{Functionality of Core}}{\text{Moles of Catalyst}}$$

As a typical illustration, in a reaction system containing 0.08 moles of difunctional core reactant, 0.49 moles of non-crosslinking, branching polymerization monomer and 0.06 moles of catalyst, the ratio of moles of catalyst to total functionality of non-crosslinking, branching polymerization monomer is 1:66.

The ratio of moles of catalyst to total functionality of non-crosslinking, branching polymerization monomer will vary for reaction systems employing different catalysts and different core reactants. For instance, for reaction systems employing sodium hydroxide as the catalyst and polyethylene glycol as the core reactant, the ratio of moles of catalyst to total functionality of non-crosslinking, branching polymerization monomer is preferably at least about 1:75. For reaction systems employing potassium hydroxide as the catalyst and random propylene oxide/ethylene oxide as the core reactant, the ratio of moles of catalyst to total functionality of non-crosslinking, branching polymerization monomer is preferably at least about 1:450.

It is believed that the difference in the minimum ratio values for reaction systems employing different catalysts and core reactants can be attributed to the ability of the various core reactants to solvate the catalyst ion pair, e.g., $RO^-K^+$, wherein $RO^-$ is the anion species derived from the core reactant and $K^+$ is the potassium cation derived from the catalyst. The active species is the highly dissociated, highly solvated ion pair. If the ion pair is bound more tightly, less solvanted, more moles of catalyst would be required to shift the equilibrium sufficiently so as to obtain at least a similar number of dissociated pairs. Thus, the amount of catalyst employed in the branching and linear polymerization reactions is dependent upon the solubility and dissociation properties of the particular catalyst in the core reactant. Reaction systems employing polyethylene glycol as the core reactant generally solvante the ion pair well forming highly dissociated species. Reaction systems employing random propylene oxide/ethylene oxide in the core reactant generally solvante the ion pair less readily and therefore require more catalyst. It is expected that as the propylene oxide content of the core reactant increases, a concomitant increase in amount of catalyst is required for the particular reaction system.

At ratios less than the minimum values for the particular catalyst and core reactant employed in preparing the connected branch copolymers, it ha been found that the desired branching and linear polymerization reactions do not suitably occur; therefore, the connected branch copolymers of this invention cannot suitably be prepared at ratios less than the above minimum values. For example, when glycidol is used as the non-crosslinking, branching polymerization monomer in a reaction system containing a ratio of moles of catalyst to total functionality of non-crosslinking, branching polymerization monomer of less than the above minimum ratio values, bases exist to believe that homopolymerization f glycidol occur thereby providing for the formation of an essentially linear polymer having a generally broad molecular weight distribution.

The branching and linear polymerization reactions may be conducted at a temperature range from about 50° to about 300° C., preferably from about 90° to about 150° C., and most preferably from about 100° to about 120° C. The reactions may be conducted at inert atmospheric or inert super-atmospheric pressures, preferably from about 10 to about 200 psig, and most preferably from about 15 to about 65 psig.

The type or amount of catalyst, temperature, pressure and other polymerization parameters will vary depending upon the type of polymerization as discussed above, using those procedures, i.e., batch or continuous methods, well established in the prior art.

The polymerization reactions are generally conducted for a period of time sufficient to enable substantially all of the monomers to be consumed, i.e., for the polymerization to go to completion, i.e., exhaustion, so as to minimize monomer content in the connected branch copolymer product and to provide the desired connected branch copolymer. Depending upon the amount and type of monomers provided, the time will vary and may take 6 hours or more for each polymerization step. Overall reaction time to form a highly branched copolymer will usually be less than 64 hours, preferably less than 36 hours, most preferably less than 8 hours, when the process involves a series of sequential polymerizations.

The branching polymerization monomers are preferably slowly added during the branching polymerization step in order to avoid the formation of monomer homopolymerization competing with polymerization steping order to avoid the formation of monomer homopolymerization competing with polymerization onto the core reactant. The branching polymerization monomers are maintained at a temperature, prior to the addition thereof in the branching polymerization step, sufficient to avoid the formation of gel particles in the reaction mixture, e.g., often times at a temperature below 30° C., preferably at a temperature of from about 0° C. to 10° C.

The two steps of branching and linear polymerizations may be repeated sequentially to the extent desirable and feasible in the particular reaction system used. Approximately 20 such repetitions is considered to be a practical maximum, although not limitative. Preferably the two steps are sequenced from 1 to about 10 times. This repetition produces a connected branch copolymer consisting of alternating branch and linear segments. The branching polymerization which occurs subsequent to a linear polymerization step entails reacting the branching polymerization monomer with the functional group at the end of the linear segments of the connected branch copolymer to provide a branch segment extending from each linear segment. The number of linear segments therefor increases with each subsequent branching step, such that the resulting branched copolymer may contain a large number of linear segments formed during the last polymerization step in a long series of polymerizations. As a result of the sequential polymerization steps, divalent linear segments are provided within the connected branch copolymer between branch segments. Monovalent linear segments are provided only by the last linear polymerization step. When the polymerization sequencing is ended with a branching polymerization step, the connected branch copolymer obviously contains only divalent linear segments. The connected branch copolymer will always contain two or more sets of linear polymer segments having substantially similar chain lengths and compositions within each set based upon a single linear polymerization step. When multiple linear polymerizations are conducted, however, the group of linear polymer segments formed during one polymerization step can be varied substantially from that of other, separate polymerization steps.

The branching and linear polymerization reactions are conducted with sufficient agitation or mixing of the reaction ingredients so as to enable essentially all of the ingredients to be reacted, and to substantially reduce the formation of gel particles in the reaction mixture.

Sufficient agitation of the reactor ingredients is necessary to provide branches with substantially similar chain length and composition. The polymerization reactions are conducted so as to maintain kinetic control and prevent diffusion control.

The connected branched copolymer may be recovered using procedures well established in the art, and may include subsequent processing steps, such as ion exchange, neutralization using, for example, magnesium silicate, phosphoric acid, acetic acid or other well known neutralizing agents, in order to obtain the desired product in a stable form.

In a typical embodiment, a catalyzed core reactant is charged to a reactor at about 110° C. under 20 psig of nitrogen. The branching polymerization monomer or mixture of monomers maintained at a temperature below 30° is then added slowly to the reactor vessel with continuous agitation. The reaction is continued until substantially all the branching polymerization monomers have been consumed. The resulting product can then be isolated before undergoing additional polymerization or, if the linear polymerization can be conducted using the same catalyst, the linear polymerization monomer or monomers mixture can be added to the reactor vessel with continuous agitation, and the reaction allowed to go to completion.

If so desired, the branching and linear polymerizations are then repeated under similar conditions using the same constituents, or under different polymerization conditions, as required, if the branching or linear polymerization monomers are changed and required different reaction conditions. Once the polymerization reactions have been completed, the connected branch copolymer product is neutralized and recovered.

Polymer/Polyol Constituents

Conceptually, the monomers used in preparing the polymer/polyols of this invention can comprise any ethylenically unsaturated monomer or monomers. A variety of monomers are disclosed in the prior patents relating to polymer/polyols previously referred to. The selection of the monomer or monomers used will depend on considerations such as the relative cost of the monomers and the product characteristics required for the intended application.

More specifically, polymer/polyols used commercially generally comprise either acrylonitrile or a mixture of acrylonitrile and styrene in varying weight ratios. For reduced scorch applications, it will generally be desirable to utilize ratios of 50:50 to 20:80, more preferably 40:60 or lower. To prepare virtually scorch-free, white slab-stock foams of densities of 1.5 pounds per cubic foot or lower, an acrylonitrile to styrene ratio of about 35:65 or lower will likely be utilized.

In accordance with the present invention, the ratio of acrylonitrile to styrene can be varied from 100:0 to 0:100 as desired for the particular application. Moreover, polymer/polyols of more than adequate stability can be prepared from any monomer or monomers, so long as, where comonomers are used, there is adequate coreactivity. In addition to acrylonitrile and styrene, illustrative examples of suitable monomers include the following: methyl methacrylate, methacrylonitrile, methacrylic acid, methacrylamide, diethyl fumarate, p-chlorostyrene, vinyl acetate, vinyl ether, ethyl acrylate, vinyl anthracene-4, divinyl carbonate, maleimide, N-dimethyl acrylamide, butyl acrylate, vinyl anthracene-9, trimethylstyrene, trichloroethylene, vinyl chloride, vinylidene chloride, divinyl sulfone, vinyl versatate, vinyl bromide, isoprene, pentachlorophenyl methacrylate, butadiene sulfone, N-t-butylacrylamide, and N-vinyl-2-pyrrolidinone.

For some applications, there is a desire to provide polymer/polyols which, when utilized in preparing polyurethane products, pass the industry-used flame retardancy or burn tests more consistently than sometimes occurs when using acrylonitrile/styrene polymer/polyols made with conventional techniques. All other parameters being the same, it has been found that polymer/polyols of the acrylonitrile/styrene type made utilizing the connected branch polyols of the present invention consistently perform better in such tests than do such polymer/polyols made using state-of-the art technology. Polymer/polyols made from other monomer systems likewise provide polyurethanes which satisfy such industry flame retardancy or burn tests.

Still further, utilization of the connected branch polyols of this invention allow the utilization of monomers to form polymer/polyols that should, in polyurethanes, impart essentially optimum flame retardancy characteristics. Stable polyvinyl carbonate polymer/polyols can be prepared by using an inert solvent. Thus, vinyl acetate may be polymerized in an inert solvent such as heptane, utilizing a connected branch polyol of the present invention to provide a stable dispersion. By conventional transesterification, such as by adding an alkyl carbonate such as ethyl carbonate, the polyvinyl acetate polymer may be converted to a polyvinyl carbonate polymer. The polyvinyl carbonate polymer dispersed in heptane can then be converted to a polyvinyl carbonate polymer/polyol by a dispersion exchange, feeding in the desired polyol while stripping the heptane. The resulting polyvinyl carbonate polymer/polyol should provide a stable, non-toxic, flame retardant polymer/polyol since the decomposition products comprise carbon dioxide, water and ethylene.

Alternatively, the stable polyvinyl acetate dispersion in the inert solvent can be converted to a polyvinyl alcohol polymer and, in turn, can be conveniently transformed into a butyral, benzal or the like polymer. By dispersion exchange, the corresponding polymer/polyol can be prepared. This provides an even wider choice of polymer structural types potentially available for the design of products with improved or new physical properties.

The polymer content of the polymer/polyol can vary within wide limits, depending upon the requirements of the anticipated end use application. It will usually be desirable to form the polymer/polyols with as high a polymer content as will provide the desired viscosity and stability properties. In general, this will vary from about 10 to about 50 percent, based upon the weight of the polymer/polyol. Lower polymer contents may, of course, be utilized; however, there is typically no incentive to use monomer amounts which will result in polymer contents lower than about 10 percent by weight because of the economic penalty due to the increased throughput involved. On the other hand, it will generally be undesirable to utilize polymer contents in excess of about 50 percent by weight or so. While useful polymer/polyols with higher polymer contents certainly can be made, such polymer/polyols may possess viscosity and stability characteristics which are commercially undesirable.

The polyol content of the polymer/polyol will thus typically vary from about 50 to about 90 percent, based upon the weight of the polymer/polyol. The relative amount of the connected branch polyol utilized will depend upon the parameters involved, viz. - the relative amount of polymer, the particular mon;omer or monomers used, the molecular weight of any base polyol (if used) and the polymer/polyol stability characteristics required. Functionally, the connected branch polyols should be present in an amount sufficient to provide the desired polymer/polyol stability characteristics. In general, the amount required to accomplish such characteristics will increase with increasing polymer contents and, when used, decreasing acrylonitrile: styrene monomer ratios and base polyol molecular weight. It should be suitable in most situations to provide a blend of a base polyol with from about 10 to about 20 weight percent based upon the total weight of the polyol. It may be desirable in some applications simply to use a connected branch polyol of this invention by itself.

When used, the selection of the base polyol (a single polyol or a blend) will depend upon the end use of the polyurethane product formed used the polymer/polyol. For example, when foams are prepared, the molecular weight or the hydroxyl number is selected to result in flexible or semi-flexible foams. The polyols in this instance preferably possess a hydroxyl number of from about 70 to about 150 for semiflexible foams and from about 25 to about 70 for flexible foams. For elastomer applications, it will generally be desirable to utilize base polyols having relatively low hydroxyl numbers, e.g., 25 to 50 or so. Such limits are not intended to be restrictive, but are merely illustrative of the large number of possible combinations for the polyol or polyols used.

The most preferred base polyols include the poly(oxypropylene) polyols. Such polyols may also include oxyethylene, desirably less than 80 percent of the total content, although minimizing the oxyethylene content will generally be desirable for most applications.

While poly(oxypropylene) polyols are preferred, virtually any of the polyols previously used in the art can be used as the base polyol. The prior patents previously referred to list a wide variety of alternative polyols.

Polymer/Polyol Preparation

The polymer/polyols of the present invention may be prepared utilizing the process set forth in the previously identified Priest et al. patent when the connected branch polyols are utilized as a blend with a base polyol. In accordance with that process, a low monomer-to-polyol ratio is maintained throughout the reaction mixture during the process. This is achieved by employing process conditions that provide rapid conversion of monomer to polymer. In practice, a low monomer-to-polyol ratio is maintained, in the case of semi-batch and continuous operation, by control of the temperature and mixing conditions and, in the case of semi-batch operation, also by slowly adding the monomers to the polyol.

The temperature range is not critical and may vary from about 25° C. to about 150° C., or perhaps greater, the preferred range being from 115° C. to 135° C. The catalyst and temperature should be selected so that the catalyst has a reasonable rate of decomposition with respect to the hold-up time in the reactor for a continuous flow reactor or the feed time for a semi-batch reactor.

Catalysts useful in producing the polymer/polyol compositions of this invention are the free radical type of vinyl polymerization catalysts such as the peroxides, percarbonates and the azo compounds or any other suitable catalyst specified in the above-mentioned patents. Azo catalysts such as azobis (isobutyronitrile) are the preferred catalysts.

The catalyst concentration is not critical in most applications and can be varied within wide limits. As a representative range, the concentration can vary from about 0.1 to about 5.0 weight percent, based upon the total feed to the reactor. Up to a certain point, increases in the catalyst concentration result in increased monomer conversion, but further increases do not substantially increase conversion. Conversions of monomers to polymers which can be typically achieved are on the order of 85% or higher of the monomer charged. The catalyst concentration selected will usually be an optimum value considering all factors, including costs.

The mixing conditions employed are those attained using a back mixed reactor (e.g. - a stirred flask or stirred autoclave). Reactors of this type keep the reaction mixture relatively homogeneous and so prevent localized high monomer- to-polyol ratios.

In addition, it should be appreciated that other of the previously mentioned prior techniques, either semi-batch or continuous, can be utilized in forming the polymer/polyols so long as the required product characteristics are not, of course, adversely affected to any significant extent.

Reaction Pathways

Polymer/polyols have been used commercially almost exclusively to impart to polyurethanes improved modulus, often termed improved load-bearing characteristics and now typically measured by a standard IFD test (Indentation Force Deflection). It has been theorized that optimum modulus improvement is obtained when the polymer/polyol is in the form of a stable dispersion, i.e., fine polymer particles distributed throughout the polyol medium.

Whether the desired polymer/polyol dispersion is obtained depends upon the predominance of the various reaction pathways which may be visualized in the free radical-initiated polymerization involved as set forth hereinafter (R—R denoting the free radical catalyst, R·, R' and R" denoting free radicals, M denoting a monomer, x being an integer representing the number of monomer units in the polymer chain and H denoting hydrogen).

Initiator Decomposition
$$R\text{—}R \rightarrow 2R\cdot$$

Reaction Pathways Leading to Polymer Chains

| | | |
|---|---|---|
| (I) | $R\cdot + M \rightarrow RM\cdot$ | Polymerization initiation |
| (II) | $RM\cdot + xM \rightarrow RM_x\text{—}M\cdot$ | Polymerization |
| (III) | $RM_xM\cdot + R'\cdot \rightarrow RM_{x+1}\text{—}R'$ | Termination by recombination (cross linking) |
| (IV) | $RM_xM\cdot + R''H \rightarrow R\text{—}M_{x+1}H + R''\cdot$ | Termination by transfer (branching) |

Reaction Pathways Leading to Polymer Dispersion Stabilization

| | | |
|---|---|---|
| (V) | Polyol-H + R'· → Polyol· + RH | Transfer to polyol by hydrogen abstraction |

| | -continued | |
|---|---|---|
| (VI) | Polyol. + M → Polyol-M. | Graft initiation |
| (VII) | Polyol-M. + xM → Polyol-(M)$_x$—(M). | Graft polymerization |
| (VIII) | Polyol (M)$_x$M. + Polyol-H → Polyol (M)$_{x+1}$H + Polyol | Graft transfer |

The effect of these various reaction pathways upon the resulting polymer/polyol may be conceptualized by reference to a polymer radical reactivity scale in which Range I is a solution, Range II is a stable dispersion and Range III is an unstable dispersion. Range I polymer/polyols result when the reaction pathways leading to graft specie which provide dispersion stability predominate. It is theorized that the graft chain transfer rate is fast relative to the rate of polymerization. The polymer chain lengths that result are viewed as being below the critical insolubilization limits, hence the product is a solution. Range III polymer/polyols result when the reaction pathways leading to polymerization predominate such that the polymerization rate is fast relative to graft chain transfer. The polymer chain lengths resulting are larger than the critical insolubilization limit, but the reaction pathways leading to stabilization result in insufficient graft specie to stabilize the dispersion. This may be due to particles agglomerating or flocculating to reduce the number of particles and increase the effective particle size. Range II polymer/polyols result when the reaction pathways leading to polymerization and polymer dispersion stabilization occur in the right proportions to produce insolubilization of the polymers while achieving a satisfactory rate of grafting.

State-of-the-art technology typically results in either Range II and III polymer/polyols, or in some situations, Range I as well. In marked contrast, based upon experimental results obtained to date, use of the connected branch polyols of the present invention results in only Range I or Range II polymer/polyols being formed. Moreover, monomer systems forming Range I polymer/polyols can, in effect, be converted to Range II polymer/polyols. Thus, by utilizing an inert solvent in which a stabilizing amount of the connected branch polyols of the present invention is included, a polymer dispersion can be prepared which may then be placed in the desired polyol after stripping off the inert solvent to form a Range II polymer/polyol.

The uniqueness in dispersion stability performance in polymer/polyol preparation attributable to the utilization of the connected branch polyols of the present invention can be perhaps best appreciated by contrasting what seemingly is promoted in the reaction pathways employing the prior art techniques in comparison to what is believed to occur in accordance with the present invention. More specifically, many of the prior art techniques involve mechanisms which seek to promote Reaction V (set forth above), viz.—transfer to the polyol by hydrogen abstraction, in the hope that Reactions VI-VII will be likewise promoted. The difficulty with this type of approach is that the enhanced hydrogen abstraction is not selective; reaction pathways leading to polymer chains will likewise be promoted. Stated another way, such an approach does not provide the ability to control the relationship between the pathways leading to dispersion stability and those leading to polymer chains so as to insure that Range II polymer/polyols are provided. The promotion of the reactions leading to polymer chains can likewise lead to adverse side effects as will be discussed more fully hereinafter.

In marked contrast, it is believed that the molecular architecture of the connected branch polyols of this invention enhances or promotes Reaction VIII (viz.—graft transfer) without affecting the reaction pathways leading to polymer chains. Accordingly, through use of the present invention, the relationship between the reaction pathways leading to dispersion stability and those leading to polymer chains may be controlled or adjusted to provide only Range I and II polymer/polyols. It is believed that the polymer chains formed tend to be relatively short, reaching the critical insolubilization limit more slowly than occurs with prior art techniques so as to enhance dispersion stability.

The prior art technique of intentionally adding unsaturation to the polyol used in whole or in part in forming the polymer/polyol is designed to provide a further reaction pathway leading to dispersion stability, viz.—by copolymerization. However, this approach can likewise result in undesirable side reactions.

Thus, both general prior art techniques can result to some extent in cross-linking taking place. In enhancing hydrogen abstraction, this can result on not only the polyol but also with a monomer or polymer; and, when two of such latter specie react together, cross-linking results. A similar situation exists when deliberate unsaturation is introduced into the polyol. Some of the polyol molecules will have more than one double bond, and cross-linking can take place.

In the present invention, there is no tendency for such undesirable side reactions to occur. This provides a polymer/polyol wherein the solid or polymer content possesses highly desirable melt flow characteristics.

More specifically, as measured by the generally accepted flame retardance or combustibility resistance test, the superior performing polymers should have melt flow characteristics such that the polymer melts and flows away from the flame at a rapid enough rate to cool the flame front below the combustion temperature so the flame will thereby be extinguished. Achieving such performance requires that crosslinking be minimized since cross-linked materials tend to char rather than simply melt away.

The superior performance in such industry tests of polyurethanes made using polymer/polyols prepared with the connected branch polyols of this invention in comparison to results achieved with polymer/polyols prepared by state-of-the art techniques dramatically supports the difference in the polymer structure which is provided. To provide improved performance, state-of-the art techniques have resorted to the use of chain transfer agents, a step which is obviated by the present invention.

Polymer/Polyol Properties

The polymer/polyols produced in accordance with this invention are characterized by highly desirable stability characteristics. The filtration and centrifugibility performance are indicative of such stability. The filtration characteristics may be determined by passing a sample of the polymer/polyol by gravity, through, successively, two wire screens. The most stable polymer/polyols will pass completely through such screens (i.e., over 99 weight percent), and this type of performance should provide a polymer/polyol capable of use in even the most rigorous applications. Polymer/polyols are, however, considered to have acceptable stability as long as the product passes completely through the initial screen.

Stability is also confirmed by the amount of material (cake) which is thrown down from samples placed in laboratory centrifuges. This is, in effect, an accelerated settling test, primarily indicative of storage stability. In general, the lower the amount of centrifugible solids obtained, the more stable is the polymer/polyol.

From the functional standpoint, suitable polymer/polyols must be capable of being: (1) made, (2) stored, (3) shipped and (4) used without undue loss of polymer content or damage or fouling of the equipment in which it is made and handled. If a polymer/polyol meets these functional criteria, it is considered satisfactorily stable. Stated another way, the filtration and centrifugibility performance characteristics described herein represent preferred performance which should be indicative that the polymer/polyol will be capable of being used in even the most rigorous applications. However, so long as the polymer/polyol satisfies the functional criteria set forth herein, it should be capable of satisfactory use for the particular application.

The polymer/polyols of this invention are also characterized by a more favorable viscosity to solids (polymer content) relationship than may be achieved using prior art techniques. In other words, higher solids content polymer/polyols may be prepared at lower polymer/polyol viscosity than would be expected using prior techniques.

ALTERNATIVE PROCESSING

In most situations, it is envisioned that the connected branch polyols will be most likely utilized as a blend with a base polyol. The base polyol, as previously discussed, will be selected on the basis of the desired characteristics for the particular polyurethane application, and the amount of the connected branch polyol utilized will be that necessary to achieve a polymer/polyol of the desired stability.

It should, however, be appreciated that the connected branch polyols of this invention may likewise be utilized in combination with any of the other techniques employed in forming polymer/polyols which have been described herein. For example, the connected branch polyols of this invention could be utilized in conjunction with the invention set forth in U.S. Pat. No. 4,148,840 to Shah. Thus, the connected branch polyol could be employed to produce a highly stable polymer/polyol which is then included in stabilizing amounts in preparing a further inherently less stable polymer/polyol to improve its stability. Likewise, the connected branch polyols could be employed to provide a preformed stabilizer as is described in U.S. Pat. No. 4,242,249. This would allow tailoring the stabilizer to the particular monomer mixture being used to form the polymer/polyol.

Conversion To Polyurethanes

The present invention also provides a method for producing polyurethane products by reacting: (a) a polymer/polyol composition of this invention, (b) an organic polyisocyanate, and (c) a catalyst for the reaction of (a) and (b) to produce the polyurethane product, and, when a foam is being prepared, a blowing agent and a foam stabilizer. The reaction and foaming operations can be performed in any suitable manner, preferably by the one-shot technique.

The polymer/polyol may, if desired, be blended with conventional polyols or the like to reduce the polymer content to the level required for the particular end use application. Blends in which the resulting polymer content is as low as 4 percent of the total weight of the blend or even less are useful.

The organic polyisocyanates that are useful in producing polyurethane products in accordnace with this invention are organic compounds that contain at least two isocyanate groups. Such compounds are well known in the art. Suitable organic polyisocyanates include the hydrocarbon diisocyanates, (e.g., the alkylene diisocyanates and the arylene diisocyanates) as well as known triisocyanates. As examples of suitable polyisocyanates, one can mention TDI, MDI, polymeric MDI, methylene bis(4-cyclohexyl isocyanate), 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl) sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatopropyl)ether of 1,4-butylene glycol, 1,11-diisocyanatoundecane, 1,12-diisocyanatododecane bis(isocyanatohexyl) sulfide, 1,4-diisocyanatobenzene, 2,4-diisocyanatotolylene, 2,6-diisocyanatotolylene, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, and 2,5-diisocyanato-1-nitrobenzene and mixtures thereof.

Any known catalysts useful in producing polyurethanes may be employed. Representative catalysts include: (a) tertiary amines such as bis(dimethylaminoethyl)ether, trimethylamine, triethylamine, N-methylmorpholine, N-ethylmorpholine, N,N-dimethylbenzylamine, N-N-dimethylethanolamine, N,N,N',N'-tetramethyl-1,3-butanediamine, triethanolamine, 1,4-diazabicyclo[2.2.2]octane, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetone-alkylenediimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, betadiketones, and 2(N,N-dialkylamino)alkanols, such as the well known chelates of titanium obtained by said or equivalent procedures; (g) salts of organic acids with a variety of metals such as alkali metals, alkaline earth metals, Al, Sn, Pb, Mn, Co, Bi, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g. dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate, dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, without the use of amines. The catalysts are employed in small amounts, for example, from about 0.001 percent to about 5 percent, based on the weight of the reaction mixture.

When the product being formed is a polyurethane foam, this may be accomplished by employing a small amount of a polyurethane blowing agent, such as water, in the reaction mixture (for example, from about 0.5 to about 5 weight percent of water, based upon total weight of the polymer/polyol composition), or through the use of blowing agents which are vaporized by the exotherm of the reaction or by a combination of the two methods. Illustrative polyurethane blowing agents include halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoromethane, hexafluorocyclobutane, octafluorocyclobutane, and the like. Another class of blowing agents include thermally unstable compounds which liberate gases upon heating, such as N,N'-dimethyl-N,N'-dinitrosoterephthalamide, amine formates, and the like. The generally preferred method of foaming for producing flexible foams is the use of water or a combination of water plus a fluorocarbon blowing agent such as trichloromonofluoromethane. The quantity of blowing agent employed will vary with factors such as the density desired in the foamed product.

The anti-scorch properties of the foams produced using polymer/polyol compositions are most evident when at least some of the blowing agent is water and the water is used in an amount that results in a foam having a density less than 3.0 pounds per cubic foot. Generally, the use of water in an amount of about 2.0 percent by weight based on the total weight of the polymer/polyol composition results in a foam having a density of less than 3.0 pounds per cubic foot.

It is also within the scope of the invention to employ small amounts, e.g., about 0.001 percent to 5.0 percent by weight, based on the total reaction mixture, of a foam stabilizer. Suitable foam stabilizers or surfactants are known and may vary depending upon the particular polyurethane application. Suitable stabilizers for slab stock applications include "hydrolyzable" polysiloxane-polyoxyalkylene block copolymers such as the block copolymers described in the U.S. Pat. Nos. 2,834,748 and 2,917,480. Another useful class of foam stabilizers are the "non-hydrolyzable" polysiloxane-polyoxyalkylene block copolymers such as the block copolymers described in U.S. Pat. No. 3,505,377; U.S. patent application No. 888,067, filed Dec. 24, 1969 and British Patent Specification No. 1,220,471. The latter class of copolymers differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These various polysiloxane-polyoxyalkylene block copolymers preferably contain from 5 to 50 weight percent of polysiloxane polymer with the remainder being polyoxyalkylene polymer.

The polyurethanes so produced may be utilized in foam and elastomer applications where any conventional type of polyurethane is or can be utilized.

The following Examples are illustrative of, but not in limitation of, the present invention. These Examples describe the preparation of connected branch polyols, connected random branch polyols and random branch polyols, the use of these polyols in the preparation of polymer/polyols, and the preparation of polyurethane foams from such polymer/polyols.

DEFINITIONS

As used in the Examples appearing below, the following designations, symbols, terms and abbreviations have the indicated meanings:

Polyol I denotes a product made by reacting propylene oxide and ethylene oxide successively with glycerol in the presence of potassium hydroxide catalyst and 18-Crown-6 ether rate assistor and refining to remove the catalyst and rate assistor. The product contains 15 wt. % ethylene oxide and has a nominal hydroxyl number of 23.

Polyol II denotes a product made similarly to Polyol I except that it contains 15 wt. % ethylene oxide and has a nominal hydroxyl number of 27.

Polyol III denotes a product made similarly to Polyol I except that it contains 15 wt. % ethylene oxide and has a nominal hydroxyl number of 34.

Polyol IV denotes a product made by reacting propylene oxide, then ethylene oxide, then additional propylene oxide in the presence of potassium hydroxide catalyst and refining to remove the catalyst. The product contains 10 wt. % internal ethylene oxide and has a nominal hydroxyl number of 52.

Polyol V denotes a product made by reacting glycerol with, successively, propylene oxide, then ethylene oxide and then a mixture of propylene oxide and allyl glycidyl ether in the presence of potassium hydroxide catalyst and refining to remove the catalyst. The product contains 10 wt. % ethylene oxide, 0.7 wt. % allyl glycidyl ether and has a nominal hydroxyl number of 52.1.

Polyol VI denotes a product made similarly to Polyol V except that it contains 1.4 wt. % allyl glycidyl ether.

Polyol VII denotes a product made similarly to Polyol V except that it contains 0.85 wt. % allyl glycidyl ether.

Polyol VIII denotes the reaction product of two moles of Polyol IV and one mole of tolylene diisocyanate.

Polyol IX denotes a product made similarly to Polyol I except it contains 16.5 wt. % ethylene glycol and has a nominal hydroxyl number of 35.

Polyol X denotes a product made from a polyol of hydroxyl number 48, formed by reacting glycerol with, successively, propylene oxide and then ethylene oxide in the presence of potassium hydroxide catalyst and refining to remove the catalyst and the addition of 750 ppm TBC. The polyol is reacted with maleic anhydride in a 1:1 molar ratio at 100° C., and the temperature is allowed to rise to 150° C. The reaction product is capped with ethylene oxide using a 6 mole excess of ethylene oxide. The final product has a nominal hydroxyl number of 46.7.

Commercial polymer/polyol A (referred to as polymer/polyol A) denotes a commercially available polymer/polyol having 21 wt. % total solids and a ratio of 52:48, acrylonitrile:styrene. The polyol is made similarly to Polyol I except that it contains 15 wt. % ethylene oxide and has a hydroxyl number of 35.5.

Commercial polymer/polyol B (referred to as polymer/polyol B) denotes a commercially available polymer/polyol having 16 wt. % total solids and a ratio of 100:0, acrylonitrile:styrene. The polyol is Polyol II.

Commercial polymer/polyol C (referred to as polymer/polyol C) denotes a 36 wt. % total solids, 72:28, acrylonitrile:styrene ratio, polymer/polyol having a hydroxyl number of 52. It is commercially available from BASF Wyandotte under the designation P-863.

Commercial polymer/polyol D (referred to as polymer/polyol D) denotes a 38 wt. % total solids, 72:28 wt. % acrylonitrile:styrene ratio polymer/polyol having a hydroxyl number of 52 and less than 1 wt. % allyl glycidyl ether added.

VAZ0-64 denotes 2,2'-azobis(isobutyronitrile).

PREPARATION OF CONNECTED BRANCH POLYOLS

Connected branch polyols were made by forming a suitable connector from a starter alkoxide, reacting the connector with a sufficient amount of glycidol to obtain the desired number of branches, and polymerizing the branched material with sufficient amount of propylene oxide to obtain a connected branch polyol of the desired molecular weight and optionally capping the polyol with ethylene oxide. The procedure used to prepare connected branch polyols is as follows.

A. Preparation of Starter

A starter alkoxide is prepared by charging a starter alcohol, such as ethylene glycol, propylene glycol, Carbowaxes, polypropylene oxide derivatives and the like, to a one liter round bottom flask, adding a solution of flaked potassium hydroxide in 100 grams of ethanol to the starter alcohol and heating the mixture to 100° C. Water formed from the reaction and the ethanol added are removed under reduced pressure (1.0 mm Hg) over a one hour period. The reaction product, the starter alkoxide, is cooled.

B. Preparation of Core Segment

A core segment, which is the reaction product of the starter alkoxide and propylene oxide, was then prepared as follows.

Starter alkoxide is charged to a 2 liter stirred reactor in a nitrogen atmosphere. Reactor pressure is increased to 5 psig with nitrogen and the reactor contents are heated to 110° C. Reactor pressure is then adjusted to 10 psig and propylene oxide is fed to the reactor at 110° C. During the propylene oxide feed, reactor pressure is allowed to increase to 60 psig. The reaction is permitted to line out at these conditions with the pressure controlling the propylene oxide feed rate. After the propylene oxide addition is complete, the reaction is continued at 110° C. for three additional hours, or to a reduced constant pressure to insure complete reaction of the propylene oxide.

C. Preparation of Core Segment-Core Branch Intermediate

Core segment-core branch intermediate is prepared by reacting the connector (of Step B) with glycidol, as follows.

Connector is charged to a 2 liter stirred stainless steel reactor under a nitrogen atmosphere. Reactor pressure is increased to 5 psi of nitrogen, and the reactor contents are heated to 100° C. Reactor pressure is then adjusted to 20 psig, and glycidol (2,3-epoxypropanol) is fed to the reactor at a temperature of 100° C. A sufficient amount of glycidol is added to obtain the desired number of branches, determined by the following relationships.

No. of branches = No. of moles of glycidol + F

No. of moles glycidol = (No of branches desired − F) × (moles of starter)

where F is the functionality of the core segment.

After the glycidol feed is complete, the reactor contents are continually heated at 110° C. for three additional hours or to a reduced constant pressure to insure complete glycidol reaction.

D. Branching Polymerization

The connected branch polyol is made by reacting the core segment-core branch intermediate with propylene oxide, as follows.

Connected branch material is charged to a 2 liter stirred steel reactor in a nitrogen atmosphere. Reactor pressure is increased to 5 psig with nitrogen, and the reactor contents are heated to 100° C. Reactor pressure is then adjusted with nitrogen to 10 psig. Reactor pressure is allowed to build to 60 psig; and once the reaction lines out at these conditions, the reaction is continued with pressure controlling propylene oxide feed. A calculated amount of propylene oxide is added to obtain the desired molecular weight. After the propylene oxide addition is complete, the reactants are continually heated at 100° C. for an additional three hours or to a reduced constant pressure to insure complete propylene oxide reaction.

Optionally, the connected branch polyols are capped with ethylene oxide to the wt. % of ethylene oxide capping desired by reacting ethylene oxide with the connected branch polyol product at a temperature of 110° C. and an initial pressure of 20 psi. The reaction temperature is maintained at 100° C. to a reduced constant pressure to insure complete reaction of the ethylene oxide.

E. Neutralization

The connected branch polyols are neutralized with glacial acetic acid under a nitrogen atmosphere to a pH of 6.8–6.5. The product is stripped at 100° C. and reduced pressure (e.g., 1 mm Hg) for one hour to remove any unreacted oxides and volatiles. A solution of 3% "Magnasol" and 1% "Hi-Flow" commercially available filter media is added to the polyol and stirred at 100° C. at 1 mm Hg for one hour and filtered to obtain a clear, colorless to slightly yellow product.

PREPARATION OF CONNECTED RANDOM BRANCH POLYOLS

The preparation of connected random branch polyols is similar to the preparation of connected branch polyols except for the change in Step C. Thus, in the preparation of the connected random branch material, in Step C above after the reactor pressure is adjusted to 20 psig with nitrogen, costreams of glycidol and propylene oxide are fed to the reactor. The amount of glycidol will be dictated by the number of branch units desired, and the ratio of propylene oxide-to-glycidol is adjusted so as to obtain the desired branch unit segment density, which will be less than 1.0. When the glycidol/propylene oxide stream feeds are complete, the reactants are continually heated for an additional three hours or to constant reduced pressure to insure complete reaction. The branches are then polymerized with propylene oxide, and may be, optionally capped with ethylene oxide following the procedure set forth in Step D above.

PREPARATION OF RANDOM BRANCH POLYOLS

Random branch polyols are prepared by first preparing the starter alkoxide as described above in connection with the preparation of connected branch polyols, then reacting the starter alkoxide with a co-stream of glycidol and propylene oxide under the conditions described in connection with the preparation of the connected random branch polyol, and finally carrying out the branching polymerization and neutralization processes described above.

PREPARATION OF POLYMER/POLYOLS

A. The following preparation will be referred to as the continuous method for the preparation of polymer/polyols utilizing in whole or in part the connected branch, connected random branch and random branch polyols described above.

Polymer/polyols were prepared in a single-stage, continuous, back-mixed reactor having four internal equally spaced vertical baffles and equipped with a mechanical agitator. Two feed streams, one comprising a premix of the selected monomers and catalyst and the other comprising the polyol feed were added simultaneously through an in-line mixer to the reactor and agitated therein. The reactor was heated initially to a temperature of about 135° C., and then the temerature was adjusted to that shown in the Examples. The feeds were continued for 90 minutes line-out before the product was collected. Product collected from the reactor was stripped at 130° C. with a nitrogen sparge and then cooled to 35° C.

B. The following preparation will be referred to as the laboratory batch method for the preparation of polymer/polyols.

A one liter, three necked, round bottom flask equipped with a mechanical stirrer, heating mantle and control, thermometer and dropping funnel, sparged with nitrogen is charged with 500 grams of polyol, and the contents are heated to 120° C. The desired monomer containing 0.6 wt. %, based on the total weight of the final polymer polyol product, VAZO-64 catalyst is charged to the reactor over a one to two hour period. The reactor contents are held for one additional hour with stirring. The product is stripped on a roto-ramp at reduced pressure (0.2 mm Hg) for one hour at 100° C., and allowed to stand overnight.

POLYMER/POLYOL PROPERTIES

Filtration Hindrance (Filterability)

This is determined by diluting one part by weight sample (e.g.—200 grams) of polymer/polyol with two parts by weight anhydrous isopropanol (e.g., 400 grams) to remove any viscosity-imposed limitations and using a fixed quantity of material in relation to a fixed cross-sectional area of screen (e.g., 1.8 sq.in.) such that about 200 grams of product are passed by gravity through a 150 or 700-mesh screen per one square inch of screen. The difference between the final and initial screen weights corresponds to the amount of polymer that did not pass through the screens. The 700-mesh screen is made with a Dutch twill weave. The actual screen used had a nominal opening of 30 microns and is described in Bulletin 46267-R of the Ronningen-Petter Company of Kalamazoo, Mich. The 150-mesh screen has a square mesh with average mesh opening of 105 microns, and it is a "Standard Tyler" 150 square mesh screen. The amount of sample which passes through the screens is reported in percent, a percentage of 100% being preferred. Trace solids will generally always be present, but a value of 100% indicates that over 99 weight percent passes through the screen.

Centrifugible Solids

After stripping unreacted monomer, the polymer/polyol composition is centrifuged for about 24 hours at about 3000 revolutions per minute and 1470 radial centrifugal "g" force. The centrifuge tube is then inverted and allowed to drain for 4 hours. The non-flowing cake remaining at the bottom of the tube is reported as weight percent of the initial weight of the composition tested.

FOAM PREPARATION

Water-blown, free-rise conventional flexible polyurethane foams were prepared using polymer/polyols, about 2 to 3 parts water, a suitable amount of amine catalyst, a stabilizing silicone surfactant, stannous octoate and a polyisocyanate reactant comprising tolylene diisocyanate.

Standard foam formulations comprising polymer/polyol, tin catalyst, surfactant, water and amine catalyst were converted to polyurethane foams using the following procedure. The polymer/polyol, water, amine catalyst and silicone surfactant were charged to a ½ gallon paper container equipped with a baffle assembly, and mixed at 2400 rpm for 60 seconds with a 2.5 inch diameter 4-blade turbine stirrer (placed one inch above the bottom of the container). The mixture was allowed to set for 15 seconds to degas. Tin catalyst was added after degassing and then the polyisocyanate reactant was added and mixing continued for 5 seconds. The mixture was poured, before it started to cream, into a supported 14 inch × 14 inch × 6 inch cardboard cake box at a temperature of about 120° F. The foam mixture was allowed to react and subsequently to rise freely in the box until the reaction was complete. The foam was then placed in a conventional oven preheated to 250° F. for 5 minutes. The foams were allowed to cure at room temperature for 24 hours. Foam density and indentation force deflection were determined pursuant to ASTM standard D3574-77.

EXAMPLES 1-25

These Examples illustrate the preparation of branch polyols. More specifically, Examples 1-19 illustrate the preparation of connected branch polyols, Examples 20-22 illustrate the preparation of connected random branch polyols and Examples 23-25 illustrate the preparation of random branch polyols.

The three different types of polyols were prepared in accordance with the appropriate procedure set forth above. In each Example, the core segment reactant was linear polyethylene glycol, the branch unit monomer was glycidol and the linear polymerization monomer was propylene oxide. Where noted, the propylene oxide polymerized branches were capped with ethylene oxide.

The amount of reactants used, and the polyol products produced are set forth in Table I.

and molecular structure which assist graft chain transfer mechanisms and thus render the connected branch polyols particularly well suited for use in the preparation of stable polymer/polyol dispersions and subsequent polyurethane preparation.

EXAMPLES 26-27

These Examples illustrate a relatively large scale production of connected branch polyols containing repeating oxypropylene units in the core and linear segments. Two polyols of different molecular weight were produced by the procedure described below which is similar to the procedure set forth above for the preparation of connected branch polyols. In these Examples, polypropylene glycol having molecular weight of 425 gm/mole was utilized as the core reactant and propylene oxide was utilized as the linear polymerization monomer. Glycidol was used as the branch unit

TABLE I

| | | Segment Reactants | | | | | | | | Properties of Polyols | | |
|---|---|---|---|---|---|---|---|---|---|---|---|---|
| | | Core | | Branch | | Legs (Linear Segment) | | | | | | |
| Example No. | Polyol Total MW[1] | MW | PO[2] Moles | Glycidol[3] wt. % | No. of Legs | Total MW (gm) | PO[4] Moles | EO Wt. % | EO[5] Moles | Unsaturation meq/gm | Viscosity | OH # |
| Ex. 1 | 1,644 | 1200 | 20.3 | 27.0 | 8 | 444 | 0 | N[6] | — | — | 20,183 | 273.0 |
| Ex. 2 | 3,859 | 1200 | 20.3 | 11.5 | 8 | 2,659 | 4.7 | N | | 0.0033 | 1,491 | 116.0 |
| Ex. 3 | 4,943 | 1200 | 20.3 | 9.0 | 8 | 3,743 | 6.9 | N | | 0.0102 | 1,127 | 90.8 |
| Ex. 4 | 5,541 | 1200 | 20.3 | 8.1 | 8 | 4,341 | 8.2 | N | | 0.0369 | 1,060 | 81.0 |
| Ex. 5 | 5,644 | 1200 | 20.3 | 7.9 | 8 | 4,444 | 8.4 | N | | 0.0030 | 1,000 | 79.5 |
| Ex. 6 | 5,991 | 1200 | 20.3 | 7.4 | 8 | 4,791 | 7.4 | 14.3 | 19.5 | 0.0142 | 1,250 | 74.9 |
| Ex. 7 | 8,271 | 1200 | 20.3 | 5.4 | 8 | 7,071 | 14.0 | N | | 0.0012 | 1,040 | 54.0 |
| Ex. 8 | 12,596 | 1200 | 20.3 | 3.5 | 8 | 11,396 | 19.9 | 12.3 | 35.2 | 0.0037 | 1,383 | 35.6 |
| Ex. 9 | 12,634 | 1200 | 20.3 | 3.5 | 8 | 11,434 | 23.3 | N | | 0.0030 | 1,600 | 35.5 |
| Ex. 10 | 5,078 | 425 | 7.2 | 8.7 | 8 | 4,653 | 8.9 | N | | 0.0091 | 625 | 88.4 |
| Ex. 11 | 13,793 | 425 | 7.2 | 3.2 | 8 | 13,368 | 27.3 | N | | 0.0096 | 1,219 | 32.5 |
| Ex. 12 | 3,747 | 650 | 11.0 | 7.7 | 6 | 3,097 | 6.4 | 14.6 | 12.2 | 0.0030 | 829 | 89.8 |
| Ex. 13 | 11,728 | 650 | 11.0 | 2.5 | 6 | 11,078 | 27.3 | 9.6 | 25.6 | 0.0000 | 2,162 | 28.7 |
| Ex. 14 | 13,800 | 425 | 7.2 | 3.2 | 8 | 13,368 | 27.3 | N | | 0.0096 | 1,219 | 37.5 |
| Ex. 15 | 13,800 | 425 | 7.2 | 3.2 | 8 | 13,368 | 27.3 | N | | 0.0096 | 1,219 | 32.5 |
| Ex. 16 | 12,000 | 425 | 7.2 | 3.2 | 8 | 13,275 | 28.0 | N | | 0.0590 | 1,320 | 37.4 |
| Ex. 17 | 8,271 | 1200 | 20.3 | 5.4 | 8 | 7,071 | 14.0 | N | | 0.0012 | 1,040 | 54.0 |
| Ex. 18 | 5,644 | 1200 | 20.3 | 7.9 | 8 | 4,444 | 8.4 | N | | 0.0030 | 1,000 | 79.5 |
| Ex. 19 | 3,800 | 650 | 11.0 | 7.8 | 6 | 3,097 | 6.4 | N | | 0.0030 | 829 | 89.8 |
| Ex. 20 | 8,000 | 1200 | 20.3 | 5.6 | 8 | 6,800 | 107.5 | N | | 0.0418 | 1,089 | 56.1 |
| Ex. 21 | 8,000 | 1200 | 20.3 | 5.6 | 8 | 6,800 | 107.5 | N | | 0.0418 | 1,089 | 56.1 |
| Ex. 22 | 3,000 | 1200 | 20.3 | 14.8 | 8 | 1,800 | 22.9 | N | | 0.0520 | 1,688 | 149.6 |
| Ex. 23 | 6,123 | 0 | — | 7.3 | 8 | 6,033 | 94.6 | N | | 0.0008 | 703 | 73.3 |
| Ex. 24 | 6,123 | 0 | — | 7.3 | 8 | 6,033 | 94.6 | N | | 0.0008 | 703 | 73.3 |
| Ex. 25 | 3,200 | 0 | — | 13.9 | 8 | 3,110 | 52.62 | N | | 0.0005 | 734 | 140.3 |

[1]Total MW = gm glycidol + gm propylene oxide (PO) + gm ethylene oxide (EO)
[2]PO MW = 59.1
[3]gm glycidol = (No. of legs − 2) × (moles connector) × (mw glycidol)
[4]PO moles = $\dfrac{\text{MW legs} - (\text{No. of legs} - 2 \times 74) - (\text{No. of EO units} \times 44)}{\text{No. of legs} \times 59.1}$ , applicable to Examples 1-19 only
[5]EO moles = (wt. % EO) × (MW polyol) ÷ 44
[6]No ethylene oxide In Table I, for Examples 1-19 the moles of propylene oxide reported for the leg (i.e., linear) segment are the statistical averages as previously noted (Table I, footnote 4). For Examples 20-25, because of the nature of the polyols prepared, i.e., connected random branch or random branch polyols, the moles of propylene oxide reported for the leg segments is the total moles of propylene oxide charged during the polyol preparation to form the branching and leg segments.

As can be seen from these Examples, the connected branch polyols can be prepared so as to have a high molecular weight (number average), i.e., greater than about 3000, and yet have a relatively low viscosity, at 25° C., typically below about 2000, although, of course, the viscosity may be higher depending on the degree of linear polymerization of the branches with an alkylene oxide such as propylene or ethylene oxide. It is the combination of higher molecular weight, low viscosity polymerization monomer. The polyols were not capped with ethylene oxide.

In Example 26, a connected branch polyol having a calculated number average molecular weight of about 7000 was prepared by the following procedure.

A reactor under a nitrogen purge was charged with 50.0 pounds of polypropylene glycol as coreactant and 15.2 pounds of 39.47% aqueous potassium hydroxide solution as catalyst. The mixture was agitated at 150 rpm and maintained at a temperature of 120° C. under full vacuum for 4 hours to strip the mixture. After stripping, 52.0 pounds of glycidol as the branch unit polymerization monomer were charged to the reactor, which was under nitrogen pressure of about 5 psig and at a temperature of about 110° C,; and the glycidol was allowed to react to completion. Exactly 750.0 pounds of propylene oxide was added to the reactor at a rate such that the pressure did not exceed 50 psig. The propylene oxide was allowed to react to completion, i.e., for about two hours at a temperature of about 110° C. Thereafter, 378 pounds of the resulting polyol (out of the 862 pounds produced) were removed from the reactor and neutralized with 2.5 pounds of acetic acid and then put on a drum tumbler for one hour. The connected branch polyol product had a number average molecular weight of about 6800, based on the hydroxyl number (of 66), an acid number of less than 0.012 and unsaturation of 0.038 meq/gm. The connected branch polyol exhibited a neat viscosity at 25° C. of 825 SUS.

In Example 27, a connected branch polyol having a calculated number average molecular weight of about 14000 was prepared by reacting the approximately 484 pounds of polyol left in the reactor from Example 26 above with an additional 378 pounds of propylene oxide. The reaction was continued for approximately three and one-half hours, after which an additional 50 pounds of propylene oxide were added. The polymerization was allowed to go to exhaustion, and the connected branch polyol so produced was removed and neutralized. The connected branch polyol had a number average molecular weight, $M_n$, of 12,000±2,000 based on the hydroxyl number (of 37.4), an acid number of 0.01, and unsaturation (meq/gm) of 0.058. The connected branch polyol exhibited a neat viscosity at 25° C. of 1320 SUS. The total polyol molecular weight, the number of legs in the branch segment and the number of moles of propylene oxide in the leg segment for the polyol prepared in this Example are the same as for the polyol prepared in Example 16.

EXAMPLES 28–42.

These Examples illustrate the preparation of 16 wt. % to 45 wt. % total solids, styrene polymer/polyols, utilizing the branch polyols prepared in prior Examples.

In Examples 28–33, styrene polymer/polyols were made with connected branch structure polyols. In Examples 34–36, styrene polymer/polyols were made with connected random branch structure polyols, and in Examples 37–39, styrene polymer/polyols were made with random branch polyols. For comparative purposes, in Examples 40–42, 16 wt. % total solids, styrene polymer/polyols were made with conventional or star polyols, namely, Polyols I, II and III, respectively.

The specific process parameters as well as the properties of the polymer/polyols are set forth in Table II.

TABLE II

| | Example No. | | | | | | | | | |
|---|---|---|---|---|---|---|---|---|---|---|
| | 28 | 29 | 30 | 31 | 32 | 33 | 34 | 35 | 36 | 37 |
| Process Parameters | | | | | | | | | | |
| Base Polyol | Ex. 14 | Ex. 15 | Ex. 16 | Ex. 17 | Ex. 18 | Ex. 19 | Ex. 20 | Ex. 21 | Ex. 22 | Ex. 23 |
| Molecular Weight | 13,800 | 13,800 | 12,000 | 8,241 | 5,644 | 3,800 | 8,000 | 8,000 | 3,000 | 6,123 |
| Hydroxyl No., mg KOH/gm | 37.5 | 32.5 | 37.4 | 54.0 | 79.5 | 89.8 | 56.1 | 56.1 | 149.6 | 73.3 |
| Viscosity at 25° C. cks | 1,219 | 1,219 | 1,360 | 1,040 | 1,060 | 829 | 1,089 | 1,089 | 1,688 | 703 |
| Reaction Temperature, °C. | 120 | 120 | 120 | 120 | 120 | 120 | 120 | 120 | 120 | 120 |
| VAZO-64 Conc., wt. % of total feed | 0.7 | 0.7 | 0.7 | 0.7 | 0.7 | 0.7 | 0.7 | 0.7 | 0.7 | 0.7 |
| Conversions: | | | | | | | | | | |
| Styrene, wt. % | 95 | 92 | 90 | 93 | 95 | 96 | 96 | 94 | 95 | 95 |
| Total Polymer, wt. % by calc. | 16 | 36 | 45 | 36 | 16 | 16 | 16 | 36 | 16 | 16 |
| Polymer/polyol properties | | | | | | | | | | |
| Hydroxyl No., mg KOH/gm by calc. | 31.5 | 20.8 | 20.6 | 34.6 | 66.8 | 75.4 | 47.1 | 35.9 | 125.7 | 61.6 |
| Brookfield Viscosity at 25° C. | 1,800 | 5,800 | 8,000 | 4,900 | 1,250 | 910 | 1,925 | 4,233 | 2,502 | 817 |
| Centrifugible Solids, wt. % | 8.8 | 26.0 | 47.4 | 16.6 | 21.1 | 20.5 | 9.4 | 47.6 | 26.3 | 20.2 |
| Filterability: | | | | | | | | | | |
| 150 mesh, % through screen solids on screen; ppm | 100 | 22.7 | 1.7 | 16.3 | 1.2 | 22.0 | 100 | 2.6 | settled | settled |
| 700 mesh, % through screen solids on screen, ppm | 100 | 0.25 | 0.17 | 15.0 | 0 | 0.16 | 7.3 | 0 | out | out |

| | Example No. | | | | |
|---|---|---|---|---|---|
| | 38 | 39 | 40 | 41 | 42 |
| Process Parameters | | | | | |
| Base Polyol | Ex. 24 | Ex. 25 | I | II | III |
| Molecular Weight | 6,123 | 3,200 | 7,000 | 5,304 | 4,266 |
| Hydroxyl No., mg KOH/gm | 73.3 | 140.3 | 23 | 27 | 34 |
| Viscosity at 25° C., cks | 703 | 734 | 1,295 | 1,200 | 360 |
| Reaction Temperature, °C. | 120 | 120 | 120 | 120 | 120 |
| VAZO-64P Conc., wt. % of total feed | 0.7 | 0.7 | 0.7 | 0.7 | 0.7 |
| wt. % polymer charged | 36 | 16 | 16 | 16 | 16 |
| Conversions: | C[1] | C[1] | C[1] | C[1] | C[1] |
| Styrene wt. % | | | | | |
| Polymer/polyol properties | | | | | |
| Hydroxyl No., mg KOH/gm by calc. | — | — | — | — | — |
| Brookfield Viscosity at 25° C., No. 3 spindle/30 rpm, cps | — | — | — | — | — |
| Centrifugible Solids, wt. % | — | — | — | — | — |
| Filterability: | | | | | |
| 150 mesh, % through screen solids on screen; ppm | — | — | — | — | — |
| 700 mesh, % through screen solids on screen, ppm | — | — | — | — | — |

[1] A polymer/polyol was not prepared because the reactants all coagulated.

The data for these Examples illustrate the dispersion stabilizing properties of the connected branch polyols in the preparation of styrene polymer/polyols. It can be seen that the connected branch polyols (Examples 28–37) stabilize styrene polymer/polyol dispersions better than total random branch or star polyols (Examples 38–42). It can further be seen that of the branch polyols (Examples 28–37), the connected branch polyols (Examples 28–33) appear to have a better stabilizing effect than connected random branch structure polyols (Examples 37–39).

Examples 28, 32 and 33 further illustrate the effect of chain length (i.e., molecular weight) of the linear propylene oxide polymerized glycidol branches on stability. At 16 wt. % styrene polymer, the higher molecular weight connected branch structure of Example 28 had both (a) higher filterability (100% pass thru with both 150 mesh and 700 mesh screens) than the comparable lower molecular weight structure of Examples 32 and 33 and (b) lower centrifugible solids—8.8 wt. % for polyol, designated CBP-2, was an opaque, butterscotch-colored material, had a viscosity, at 25° C., of 3480 cps and a hydroxyl number of 33.4.

CBP-1 polymer/polyol was prepared so as to have a polymer type and content comparable to polymer/polyol B, and CBP-2 polymer/polyol was prepared so as to have a polymer type and content comparable to commercial polymer/polyol A. The CBP-1 polymer/polyol was a transparent dark tea color in contrast to commercial polymer/polyol B which was opaque. The appearances of CBP-2 polymer/polyol and polymer/polyol A were similar.

The properties of the polymer/polyols A and B and of the novel polymer polyols, CBP-1 and CBP-2 of the present invention are set forth in Table III:

TABLE III

| Polymer/Polyol | % Polymer | % Acyronitrile | % Styrene | $n_{25}$ | % passed thru 150 Mesh 1200 Sec. | 700 Mesh 1200 Sec. | % Centrifigible Solids |
|---|---|---|---|---|---|---|---|
| 1. polymer/polyol A | 22 | 11 | 11 | 2150 | 100 | 100 | 4.0 |
| CBP-2 | 22 | 11 | 11 | 3480 | 100 | 100 | 2.5 |
| 2. polymer/polyol B | 16 | 16 | — | 3500 | 100 | 100 | 2.0 |
| CBP-1 | 16 | 16 | — | 2325 | 100 | 100 | 1.8 |

Example 28 as opposed to 21.1 wt. % and 20.5 wt. % for Examples 32 and 33, respectively. Thus, it is believed that linear polymer segments of longer chain lengths of the connected branch polyols contribute to the increased stability of polymer/polyol dispersions made using connected branch polyols.

EXAMPLE 43

This Example illustrates the comparison of the stability of present commercial acrylonitile and acrylonitrile/styrene polymer/polyols with similar polymer/polyols made using connected branch structure polyols in accordance with the present invention. Comparison is made of both 16 wt. % and 22 wt. % total solids polymer/polyols. The respective total solids polymer/polyols were made in accordance with the following procedures.

A 16 wt. % acrylonitrile polymer/polyol was made using the connected branch polyol of Example 9. It was prepared by reacting at 120° C. for two hours, 198 gm polyol of Example 9 with 88 gm acrylonitrile in the presence of 18 gm VAZO-64 catalyst and then feeding to the reaction vessel a post feed (at 120° C. for one hr.) comprising 33 gm polyol of Example 9 and 0.44 gm VAZO-64. The resulting polymer/polyol, designated CBP-1, had a viscosity at 25° C., of 2325 cps and a hydroxyl number of 31.3.

A 22 wt. %, total solids, 50/50 styrene/acrylonitrile polymer/polyol was made using the connected branch polyol of Example 9. It was prepared by reacting at 120° C. for two hours, 181.5 gm polyol of Example 9 with a monomer stream comprising 60.5 gm styrene and 60.5 gm acrylonitrile in the presence of 2.42 gm VAZO-64, and then feeding to the reaction vessel a post feed (at 120° C. for one hr.) comprising 33 gm polyol of Example 9 and 0.61 gm VAZO-64. The resulting polymer/-

The data illustrate the surprising stabilizing effect of the connected branch polyols when used in the formation of polymer/polyols. The CBP-1 polymer/polyol formed a clear solution, which, it would be expected, would result in an increase in the viscosity of the polymer/polyol product. However, at the same wt. % total polymer, the viscosity of CBP-1 polymer/polyols were lower than polymer/polyol B; and the centrifugible solids for the CBP-1 polymer/polyol was likewise lower than the centrifugible solids for the polymer/polyol B. These results are thus illustrative of the more efficient grafting capability of the connected branch polyols of the present invention. Further the data suggests that the mode of monomer grafting with the connected branch polyols is different than the mode of monomer grafting encountered with conventional or star polyols.

The increased stability of the connected branch polyols in the formation of polymer/polyols is similarly readily observable from the comparative data for CBP-2 and polymer/polyol A. Although the CBP-2 polymer/polyol had slightly higher viscosity than polymer/polyol A, its centrifugible solids were significantly lower.

EXAMPLES 44–50

These Examples illustrate the effectiveness of connected branch polyols as an additive stabilizer in the formation of polymer/polyols using a blend of connected branch polyols and conventional or star polyols. For comparative purposes, other commercial type polymer/polyols using different stabilizers are set forth.

The specific process parameters used in preparing the polymer/polyols of these Examples and the properties of the polymer/polyols are set forth in Table IV.

TABLE IV

| | Example No. | | | | | | |
|---|---|---|---|---|---|---|---|
| | 44 | 45 | 46 | 47 | 48 | 49 | 50 |
| Polyol type & wt. % | | | | | | | |
| Polyol IV | 80 | 80 | 75 | — | — | — | — |

TABLE IV-continued

| | Example No. | | | | | | |
|---|---|---|---|---|---|---|---|
| | 44 | 45 | 46 | 47 | 48 | 49 | 50 |
| Polyol V | — | — | — | 100 | 100 | — | — |
| Polyol VI | — | — | — | — | — | 100 | — |
| Polyol VII | — | — | — | — | — | — | 15 |
| Polyol VIII | — | — | — | — | — | — | 85 |
| Polyol X | — | — | 25 | — | — | — | — |
| Ex. 7 | 20 | 20 | — | — | — | — | — |
| ACN/Sty ratio | 40/60 | 40/60 | 40/60 | 40/60 | 40/60 | 40/60 | 40/60 |
| Wt. % monomer | 33.62 | 37.83 | 35.4 | 34.6 | 47.4 | 34.8 | 33.8 |
| Residence time, sec | 11.62 | 12 | 12 | 12 | 12 | 12 | 12.1 |
| Material balance | 99.86 | — | 99.5 | 99.7 | — | 100.1 | 100.1 |
| ACN monomer, wt. % | 1.47 | 1.47 | 1.17 | 1.44 | 1.44 | 1.44 | 1.55 |
| Sty monomer, wt. % | 1.53 | 1.53 | 1.16 | 1.47 | 1.47 | 1.35 | 1.55 |
| AIBN (total feed), wt. % | .71 | .71 | .7 | .7 | .7 | .7 | .5 |
| Reactor Temp. °C. | 125 | 125 | 125 | 125 | 125 | 125 | 125 |
| % glycidol | .7 | .7 | — | — | — | — | — |
| % allyl glycidol ether | — | — | — | .7 | .7 | 1.4 | .85 |
| Conversion | | | | | | | |
| ACN | 89.1 | — | 91.4 | 89.4 | — | 89.4 | 88.4 |
| Sty | 92.4 | — | 94.3 | 92.8 | — | 93.4 | 92.3 |
| Overall | 91.1 | 90.1 | 93.2 | 91.4 | 91.5 | 91.8 | 90.7 |
| Polymer, wt. % | | | | | | | |
| poly Acn | 12.4 | 13.8 | 12.6 | 12.6 | 13.8 | 12.6 | 12.2 |
| poly styrene | 19.2 | 20.6 | 20.1 | 19.6 | 20.6 | 19.7 | 19.1 |
| total polymer | 31.6 | 34.4 | 33.1 | 32.2 | 34.4 | 32.3 | 31.2 |
| Brookfield viscosity, cps | 2360 | 2890 | 3120 | 2950 | 3800 | 2790 | 3590 |
| Filtration, % through | | | | | | | |
| 150 mesh | 100 | — | 100 | 100 | — | 66 | 100 |
| 700 mesh | 58 | — | 87.3 | 2.3 | — | 4.7 | 19 |
| Centrifugable solids, % | 13.3 | — | 3.7 | 16.4 | — | 8.3 | 10.9 |

The stabilizing agent in Examples 44 and 45 is a connected branch polyol with the stabilizing species being glycidol branching. In Example 46, the stabilizer is maleic anhydride. In Examples 47 and 48, the stabilizer is allyl glycidyl ether present in an amount of about 0.7 wt. % of the total weight of the polymer/polyol, and in Example 49, the stabilizer is 1.4 wt. %, allyl glycidyl ether. In Example 50, the stabilizer is 0.85 wt. % allyl glycidyl ether and with tolylene diisocyanate coupling having been employed.

The data illustrate that, with respect to centrifugible solids, the connected branch polyol-stabilized polymer/polyols show a slight advantage in relation to allyl glycidyl ether stabilized polymer/polyols, (Cf. Examples 44 and 47) at about equal weight concentration of grafting site specie, believed to be the tertiary hydrogen on the glycidol moiety in the connected branch polyol, and the allyl moiety on the allyl glycidyl ether stabilized polyol. Significantly, however, the connected branch polyol-stabilized polymer/polyol filters much better through the rigorous 700 mesh screen test, approximately 58% versus a little more than 2%. Moreover, increasing the allyl glycidyl ether content of the polyol to purportedly improve polymer/polyols made therefrom, actually results in a less desirable polymer/polyol as can be seen from the filterability data of Example 49. A higher amount of grafting site specie, i.e., allyl glycidyl ether, in the polyol (Example 49) provided a less desirable polymer/polyol in terms of the filtration test than a lower amount of the same grafting site specie (Example 48), apparently because of increased cross-linking at the grafting sites.

In addition, not only was the viscosity of the connected branch polyol-stabilized polymer/polyols (Example 44) substantially lower than the viscosity of the other stabilized polymer/polyols (Examples 46–50), but the increase in viscosity observed as a result of an increase in total wt. % polymer in the polymer/polyol for the connected branch polyol stabilized polymer/polyols was less than the increase observed with a lesser increase in total wt. % polymer in the polymer/polyol for allyl glycidyl ether-stabilized polymer/polyols, as illustrated in the viscosity data for Examples 47 and 48 as compared to Examples 44 and 45. Thus, it would be expected that polymer/polyols in which the stabilizer is a connected branch polyol could be driven to higher total solids content and still form commercially useful polymer/polyols.

EXAMPLES 51–57

These Examples illustrate the preparation of 30 wt. % total solids polymer/polyols with a monomer blend of at least 90 wt. % styrene monomer and up to 10 wt. % of a second monomer or blend of monomers. The polyols used are an 80:20 wt. % ratio of Polyol III and connected branch polyol. In Example 51, the connected branch polyol of Example 27 was used as the dispersion stabilizer, while, in Examples 52–57, the connected branch polyol of Example 26, capped with 15 wt. % ethylene oxide, was used as the dispersion stabilizer.

The polymer composition and physical properties of these polymer/polyols is set forth in Table V.

TABLE V

| Ex. No. | Polyol | Monomer[1] type/wt. ratio | Viscosity $n25°$ C. (Cps) | OH # | Acid Meq/gm |
|---|---|---|---|---|---|
| 51 | Polyol III/ Ex. 27 | S/A/VAc 94:3:3 | 2385 | 24.6 | 0.021 |
| 52 | Polyol III/ Ex. 26 | S/A 90:10 | 3760 | 28.7 | 0.013 |
| 53 | Polyol III/ Ex. 26 | S/BS 90:10 | 2090 | 29.7 | 0.024 |
| 54 | Polyol III/ Ex. 26 | S/VP 90:10 | 1520 | 26.6 | 0.015 |
| 55 | Polyol III/ Ex. 26 | S/PCMA 90:10 | 1960 | 27.3 | 0.013 |
| 56 | Polyol III/ | S/VAc/A | 1790 | 27.5 | 0.015 |

TABLE V-continued

| Ex. No. | Polyol | Monomer[1] type/wt. ratio | Viscosity n25° C. (Cps) | OH # | Acid Meq/gm |
|---|---|---|---|---|---|
| | Ex. 26 | 97:1.5:1.5 | | | |
| 57 | Polyol III/ | S/PCMA/tBA | 2360 | 24.0 | 0.001 |
| | Ex. 26 | 94:3:3 | | | |

[1]Monomer type:
S denotes Styrene
A denotes Acrylonitrile
VAc denotes Vinyl Acetate
BS denotes Butadiene Sulfone
VP denotes N—Vinyl-2-Pyrrolidinone
PCMA denotes Pentachlorophenylmethacrylate
tBA denotes N—t-Butyl acrylamide Each of the polymer/polyols of Examples 51–57 were found to be stable. Thus, these Examples illustrate the improved stabilizing effect of the connected branch polyols in the preparation of polymer/polyols using a wide variety of monomer blends. Polyurethane foams were made from the polymer/polyols of Examples 52–57, as described more fully hereinafter in Examples 71–76.

EXAMPLES 58–63

These Examples illustrate the preparation of stable homopolymer/polyol dispersions using from 6 to 15 wt. % connected branch polyols as the graft-dispersion stabilizer in heptane and homopolymers of methacrylic acid, methyl methacrylate and vinyl acetate.

The stable homopolymer polyol dispersions of these Examples were made by charging heptane and the polyol of Example 26 to a 5 liter, 3-neck, round bottom flask equipped with a dropping funnel, nitrogen bubbler, mechanical stirrer, distillation head and heating mantle, monitored by "Thermo-o-watch" and "Waterwatch" controllers. Vinyl acetate monomer, heptane as the dispersion media, and 1.3 wt. %, based on the monomer charged, VAZO-64 catalyst were then added dropwise to the flask over a two hour period while maintaining a temperature of 95° C. The reactants were then stirred for one hour. Sufficient Polyol III was then added and heptane was stripped off to provide a final polymer/polyol product having 28 wt. % total solids content.

The specific process parameters used in preparing the polymer/polyols are set forth in Table VI.

TABLE VI

| Heptane Dispersion | Example No. | | | | | |
|---|---|---|---|---|---|---|
| Composition | 58 | 59 | 60 | 61 | 62 | 63 |
| Monomer | | | | | | |
| Type[1] | MA | MA | MM | MM | MM | VA |
| Amount as wt. % of dispersion | 15 | 22 | 15 | 22 | 43 | 22 |
| Connected Branch Polyol, Ex. No. | 26 | 26 | 26 | 26 | 26 | 26 |
| Wt. % of dispersion | 15 | 8 | 15 | 8 | 6 | 8 |

[1]MA denotes methacrylic acid
MM denotes methylmethacrylate
VA denotes vinyl acetate The polymer/polyols prepared in each of these Examples were stable dispersions, white in appearance.

For purposes of comparison, it is noted that attempts to prepare stable polymer/polyol dispersions of these monomers using Polyol III as the stabilizer were unsuccessful; the monomer mixture started to gel before even 10 wt. % solids were reached.

Thus, these Examples illustrate the efficient grafting capabilities obtained in polymer/polyol preparation using the connected branch polyols of the present invention. Moreover, these Examples, and Examples 51–57, demonstrate the feasibility of utilizing connected branch polyols not only in the preparation of a wide variety of monomers and monomer blends, but also for the preparation of polymer/polyol dispersions using monomers that do not typically readily form satisfactory stable polymer/polyol dispersions with conventional polyols. Accordingly, the use of connected branch polyols allows for a wide selection of the desired monomer or monomer blend that can be tailored depending on the product characteristics required for the intended application.

EXAMPLES 64–67

These Examples illustrate the preparation of medium density (2.5 pcf) high resiliency foams utilizing connected branch polyol-stabilized polymer/polyols prepared in prior Examples. The foams were prepared according to the procedure set forth above. The foam cream time was about 5 seconds, and the mold exit time was about 45 seconds.

In Example 65, foam was made from a 75:25 blend of Polyol IX and a 42 wt. % total solids, styrene polymer/polyol made using the connected branch polyol of Example 27. In Example 66, foam was made from a 50:50 blend of polymer/polyol A and connected branch polyol of Example 27, and, in Example 67, foam was made from a 75:25 mixture of the connected branch polyol of Example 27 and the 42 wt. % total solids, styrene polymer/polyol used in Example 65. For comparative purposes, in Example 64, foam was prepared from polymer/polyol A and Polyol IX.

The base polyols and polymer/polyols used in the foam preparation of these Examples, the relative parts by weight of each used and the foam properties of the resulting foams are set forth in Table III.

TABLE VII

| Polymer/polyol | Ex. 64 | Ex. 65 | Ex. 66 | Ex. 67 |
|---|---|---|---|---|
| Polyol IX | 50 | 75 | | |
| Polymer/polyol A | 50 | | 50 | |
| Ex. 27 | | | 50 | 75 |
| Ex. 27[1] | | 25 | | 25 |
| Foam Properties | | | | |
| Porosity, SCFM/ft²/½" | 45 | 32 | 68 | 19 |
| Resiliency, % | 69 | 65 | 68 | 65 |
| IFD at 25%, lbs. (4" sample) | 27 | 33 | 34 | 38 |
| IFD at 50%, lbs. (4" sample) | 47 | 54 | 57 | 62 |
| Density, pcf | 2.45 | 2.44 | 2.52 | 2.48 |
| 75% Compression Set, % | 8.7 | 9.0 | 8.7 | 9.1 |
| 50% Humid Aged C.S., % | 29.5 | 21.9 | 20.3 | 16.6 |
| Tensile Strength, psi | 20.6 | 15.0 | 18.5 | 13.0 |
| Elongation, % | 128 | 95 | 92 | 65 |
| Tear, lbs./in. | 1.4 | 1.1 | 1.0 | 0.6 |
| Humid Aged Load Loss, % | 5.9 | 8.6 | 9.4 | 9.3 |
| FB Dynamic Fatigue No. | 72.4 | 79.7 | 73.2 | 71.3 |
| MVSS-302 Burn Length, in. | 1.4 | 1.2 | 1.6 | 1.4 |

[1]The polyol of EX. 27 was capped with 15 wt. % ethylene oxide prior to the preparation of the polymer/polyol. A 42 wt. % total solids, styrene polymer/polyol was prepared from the polyol of Ex. 27 and used in these Examples.

As can be seen from the Examples, the styrene polymer/polyol made using the connected branch polyol (Examples 65 and 66) appears to impart to the foam firmness which is somewhat higher than an equivalent solids level of a 50:50 acrylonitrile:styrene polymer/polyol prepared with convention polyols (Example 64), under similar reaction conditions and formulations. Some of the increased stiffness may be due the connected branch polyol itself (Example 66). Good burning test results were obtained on foams made using connected branch polyols.

EXAMPLES 68-70

These Examples illustrate the preparation of foams from a 40 wt. % solids, 35:65 acrylonitrile:styrene polymer/polyol where the polyol is the connected branch polyol of Example 26. The polymer/polyol had a hydroxyl number of 40.3 and a viscosity at 25% of 14,300 cps. The polymer/polyol was prepared by a batch method which inherently results in a high viscosity. It is believed that if the polymer/polyol would have been prepared by other methods, e.g., in a continuous reactor, that the viscosity of the polymer/polyol would have been much lower. For comparative purposes, polymer/polyols C and D, which are used as standards for load-bearing free rise foams, were also used to prepare foams. The foams were prepared using the procedure set forth above, except that about 7.3 parts water were used. In all cases, foams were made on the first attempt using existing formulations.

The polymer/polyols used to prepare the foams, including the parts by weight thereof, the foam reactivity and foam properties are set forth in Table VIII.

TABLE VIII

|  | Ex. 68 | Ex. 69 | Ex. 70 |
| --- | --- | --- | --- |
| Polymer/polyols |  |  |  |
| Polymer/polyol C | 100 | — | — |
| Polymer/polyol D | — | 100 | — |
| Ex. 26 | — | — | 100 |
| Foam Reactivity and Properties |  |  |  |
| Polyol Temp. °F. | 90 | 90 | 90 |
| Cream Time, sec. | 8 | 8 | 8 |
| Rise Time, sec. | 130 | 126 | 116 |
| Settling | nil | nil | nil |
| Shrinkage | nil | nil | nil |
| Density, pcf | 2.58 | 2.58 | 2.36 |
| Porosity, SCFM/ft$^2$/1½" | 15 | 8.4 | 0.015 |
| Tensile strength, psi | 32.5 | 27.2 | 26.0 |
| Elongation, % | 92 | 61 | 48 |
| Tear, lbs./in. | 2.49 | 2.79 | 1.42 |
| CLD at 25%, psi | 1.49 | 1.73 | 1.97 |
| CLD at 65%, psi | 2.53 | 3.09 | 3.81 |

As can be seen from the Examples, foams made from polymer/polyols using connected branch polyols tend to have a faster rise time than foams made with conventional polymer/polyols. Further, at standard foam formulations, foams made from polymer/polyols including connected branch polyols have a lower density and lower porosity which is indicative of a closed cell structure. As a result, such foams have lower elongation and tear characteristics but significantly higher load-bearing capacities than foams made with conventional polymer/polyols (Examples 68 and 69). The foam, moreover, was white and scorch-free.

EXAMPLES 71-76

To illustrate the utility of connected branch polyol stabilized polymer/polyols in the preparation of burn-resistant, high resiliency, molded foams, foams were prepared from the polymer/polyols of Examples 52-57 and tested for total burn length in accordance with MVSS-302, the standard foam combustibility resistance test used in motor vehicle applications.

The foams were prepared using 100% polymer/polyol (i.e., not diluted with a base polyol) with TDI 103 isocynate index by the standard technique. The IFD for the foams and the results of the burn test are set forth in Table IX.

TABLE IX

|  |  | IFD, lbs. | | |
| --- | --- | --- | --- | --- |
| Examples | Polymer/Polyol | 25% | 50% | Total Burn Length, inch |
| 71 | Ex. 52 | 56 | 103 | 2.3 |
| 72 | Ex. 53 | 34 | 60 | 2.3 |
| 73 | Ex. 54 | 34 | 60 | 3.0 |
| 74 | Ex. 55 | 50 | 91 | 2.1 |
| 75 | Ex. 56 | 36 | 69 | 2.9 |
| 76 | Ex. 57 | 48 | 86 | 2.5 |

All of the foams prepared using the connected branch polyol-stabilized polymer/polyols had a total burn length of less than the 3.5 required by MVSS-302 in order to get an SE-NBR rating. Thus, it is seen that combustibility resistant polyurethane foams can be made from high styrene containing connected branch polyol-stabilized polymer/polyols. The improvement in performance is considered to be due to the superior melt flow characteristics. Moreover, the use of connected branch polyols as polymer/polyol stabilizers permits the use of monomers or combinations of monomers (such as, for example, pentachlorophenylmethacrylate-Example 55) that should be capable of imparting improved combustibility resistance to the foam due to the composition of the monomer, e.g., the presence of chlorine in pentachlorophenylmethylmethacrylate.

EXAMPLE 77

This Example illustrates the preparation of stable polyvinyl carbonate polymer/polyols using connected branch polyols as a stabilizer. In this Example, vinyl acetate was polymerized in heptane (as a dispersion medium), utilizing a connected branch polyol to provide a stable dispersion (Example 63). The polyvinyl acetate was converted by conventional techniques to polyvinyl alcohol by reacting the polyvinyl acetate with methanol in the presence of a catalyst. The polyvinyl alcohol was then reacted with diethylcarbonate to convert the polyvinyl alcohol to a polycarbonate dispersed in heptane. The polycarbonate dispersed in heptane was then converted to a polycarbonate polymer/polyol by feeding in the desired polyol while removing heptane. The procedure for preparing the polycarbonate polymer/polyol is as follows:

The polyvinyl acetate polymer in heptane dispersion was prepared as follows: A 5 liter, 3 neck flask equipped with a dropping funnel, nitrogen bubbles, mechanical stirrer, distillation head and heating mantle, monitored by "Therm-o-watch" and "Water-watch" controllers was charged with 400 grams of heptane and 150 grams connected branch polyol of Example 26 as a stabilizer calculated for 5.0 wt. % of a final polymer/polyol of 28 wt. % total solids. While maintaining the temperature at 95° C., 602 grams vinyl acetate, 250 grams heptane dispersion media and 8 grams VAZO-64 catalyst were added to the flask dropwise over a two hour period and the contents were stirred for one hour thereafter. The vinyl acetate polymer was confirmed by infrared bands at 1740 and 1110 cm$^{-1}$.

The polyvinyl acetate polymer in heptane dispersion was converted to polyvinyl alcohol as follows. To the polyvinyl acetate in heptane dispersion, 450 grams methanol and 3 grams potassium carbonate were added; and the reactant mixture was refluxed until the head temperature stabilized at 48°-54° C. Methyl acetate was removed; and refluxing continued until no further acetate was observed by infrared analysis and hydroxyl groups, at 3600–3400 cm$^{-1}$ and 1100 cm$^{-1}$ appear. Methanol and/or heptane were added to the refluxing mixture to keep the viscosity of the reaction mixture low.

The polyvinyl alcohol in heptane dispersion was converted to polyvinyl carbonate in heptane dispersion by adding 500 grams diethylcarbonate to the polyvinyl alcohol in heptane dispersion and heating the mixture to reflux at 90° C. About 644 grams of ethanol were distilled off, and heptane was added as needed to keep the reaction mixture viscosity low. Polyvinyl carbonate was confirmed by the presence of bands at 1740 and 1150 cm$^{-1}$ by infrared analysis.

The polyvinyl carbonate in heptane dispersion was then converted to a polyvinyl carbonate polymer/polyol by adding to this dispersion 1044 grams of Polyol III and stripping off the heptane. The resulting polymer/polyol was a white stable dispersion.

It can be seen that by utilizing this technique a suitable polyvinyl carbonate polymer/polyol can be readily prepared. The polyvinyl carbonate polymer/polyols should provide a stable, non-toxic, flame retardant polymer/polyol since the decomposition products comprise carbon dioxide, water and ethylene.

What is claimed is:

1. A normally liquid, stable polymer/polyol composition formed by polymerizing in the presence of a free radical catalyst, (1) from about 10 to about 50 weight percent of an ethylenically unsaturated monomer or monomers dissolved or dispersed in (2) from about 50 to about 90 weight percent of a polyol mixture comprising (a) a base polyol and (b) a connected branch polyol comprising a core segment having a number average molecular weight of at least about 240, one core branch unit directly connected to each end of said core segment, at least one additional branch unit at each end connected directly or indirectly to said core branch units, said branch units forming a branch unit segment, and linear polymer segments connected to said branch units and having a number average molecular weight of at least about 240, said connected branch polyol being present in an amount ranging from the amount sufficient to stabilize the polymer/polyol to 100 weight percent of the polyol mixture.

2. The polymer/polyol composition of claim 1 wherein said connected branch polyol is present in an amount sufficient to stabilize the polymer/polyol.

3. The polymer/polyol composition of claim 2 wherein said core segment comprises a polypropylene glycol residue.

4. The polymer/polyol composition of claim 2 wherein said branch units comprise a vicinal epoxide alcohol residue.

5. The polymer/polyol composition of claim 4 wherein said vicinal epoxide alcohol is glycidol.

6. The polymer/polyol composition of claim 2 wherein said linear segment is formed from propylene oxide.

7. The polymer/polyol composition of claim 6 wherein the number average molecular weight of said linear segments is at least about 1000.

8. The polymer/polyol composition of claim 6 wherein said linear segments are capped with ethylene oxide.

9. The polymer/polyol composition of claim 2 wherein there are at least two additional branch units at each end.

10. The polymer/polyol composition of claim 2 wherein the branch unit segment density is 1.0.

11. The polymer/polyol composition of claim 2 wherein the branch unit segment density is less than 1.0.

12. The polymer/polyol composition of claim 2 wherein said core segment is a polypropylene glycol residue, said branch units are a glycidol residue and said linear segments are formed from propylene oxide.

13. The polymer/polyol composition of claim 12 wherein the branch unit segment density is 1.0.

14. The polymer/polyol composition of claim 2 wherein said ethylenically unsaturated monomer or monomers are members selected from the group consisting of acrylonitrile, styrene, methyl methacrylate, methacrylonitrile, methacrylic acid, methacrylamide, diethyl fumarate, p-chlorostyrene, vinyl acetate, vinyl ether, ethyl acrylate, vinyl anthracene-4, divinyl carbonate, maleimide, N-dimethyl acrylamide, butyl acrylate, vinyl anthracene-9, trimethylstyrene, trichloroethylene, vinyl chloride, vinylidene chloride, divinyl sulfone, vinyl versatate, vinyl bromide, isoprene, pentachlorophenyl methacrylate, butadiene sulfone, N-t-butyl-acrylamide and N-vinyl-2-pyrrolidinone.

15. The polymer/polyol composition of claim 14 wherein the ethylenically unsaturated monomers are acrylonitrile and styrene in a weight ratio, respectively, of from about 0:100 to about 100:0.

16. The polymer/polyol composition of claim 15 wherein the weight ratio of acrylonitrile and styrene is about 35:65 or less.

17. The polymer/polyol composition of claim 2 wherein the ethylenically unsaturated monomer or monomers are present in an amount of at least about 35 weight percent.

18. A process for producing a normally liquid, stable polymer/polyol which comprises: (a) providing a polyol mixture comprising (1) a base polyol and (2) a connected branch polyol comprising a core segment having a number average molecular weight of at least about 240, one core branch unit directly connected to each end of said core segment, at least one additional branch unit at each end connected directly or indirectly to said core branch units, said branch units forming a branch unit segment, and linear polymer segments connected to said branch units, said linear polymer segments having a number average molecular weight of at least about 240, (b) dissolving or dispersing from about 10 to about 50 weight percent of an ethylenically unsaturated monomer or monomers in from about 50 to about 90 weight percent of said polyol mixture, and (c) polymerizing the ethylenically unsaturated monomer or monomers dissolved or dispersed in said polyol mixture in the presence of a free radical catalyst, said connected branch polyol being present in an amount ranging from the amount sufficient to stabilize the resulting polymer/polyol to 100 weight percent of said polyol mixture.

19. The process for producing the normally liquid, stable polymer/polyol composition of claim 18 wherein said base polyol is present in an amount of at least 50 weight percent of the polyol mixture.

20. The process for producing the normally liquid, stable polymer/polyol composition of claim 19 wherein said core segment is a polypropylene glycol residue.

21. The process for producing the normally liquid, stable polymer/polyol composition of claim 19 wherein said branch units are a vicinal epoxide alcohol residue.

22. The process for producing the normally liquid, stable polymer/polyol composition of claim 21 wherein the vicinal epoxide alcohol is glycidol.

23. The process for producing the normally liquid, stable polymer/polyol composition of claim 19 wherein said linear polymer segments are formed from propylene oxide.

24. The process for producing the normally liquid, stable polymer/polyol composition of claim 23 wherein the number average molecular weight of said linear polymer segments is at least about 1000.

25. The process for producing the normally liquid, stable polymer/polyol composition of claim 24 wherein said linear polymer segments are capped with ethylene oxide.

26. The process for producing the normally liquid, stable polymer/polyol composition of claim 19 wherein there are at least two additional branch units.

27. The process for producing the normally liquid, stable polymer/polyol composition of claim 19 wherein the branch unit segment density is 1.0.

28. The process for producing the normally liquid, stable polymer/polyol composition of claim 19 wherein the branch unit segment density is less than 1.0.

29. The process for producing the normally liquid, stable polymer/polyol composition of claim 19 wherein said core segment is a polypropylene glycol residue, said branch units are a glycidol residue and said linear polymer segments are formed from propylene.

30. The process for producing the normally liquid, stable polymer/polyol composition of claim 29 wherein the branch unit segment density is 1.0.

31. The process for producing the normally liquid, stable polymer/polyol composition of claim 19 wherein the ethylenically unsaturated monomer or monomers are members selected from the group consisting of acrylonitrile, styrene, methyl methacrylate, methacrylonitrile, methacrylic acid, methacrylamide, diethyl fumarate, p-chlorostyrene, vinyl acetate, vinyl ether, ethyl acrylate, vinyl anthracene-4, divinyl carbonate, maleimide, N-dimethyl acrylamide, butyl acrylate, vinyl anthracene-9, trimethylstyrene, trichloroethylene, vinyl chloride, vinylidene chloride, divinyl sulfone, vinyl versatate, vinyl bromide, isoprene, pentachlorophenyl methacrylate, butadiene sulfone, N-t-butyl-acrylamide and N-vinyl-2-pyrrolidinone.

32. The process for producing the normally liquid, stable polymer/polyol composition of claim 31 wherein the ethylenically unsaturated monomers are acrylonitrile and styrene in a weight ratio, respectively, of from about 0:100 to about 100:0.

33. The process for producing the normally liquid, stable polymer/polyol composition of claim 32 wherein the acrylonitrile to styrene ratio is about 35:65 or less.

34. The process for producing the normally liquid, stable polymer/polyol composition of claim 19 wherein the ethylenically unsaturated monomer or monomers are present in an amount of at least about 35 weight percent.

35. A method for producing a polyurethane by reacting a mixture comprising (a) the polmer/polyol composition claimed in claim 1; (b) an organic polyisocyanate and (c) a catalyst for the reaction of (a) and (b) to produce the polyurethane.

36. The method for producing the polyurethane of claim 35 wherein the mixture includes a blowing agent and a foam stabilizer.

37. A method for producing the polyurethane of claim 36 wherein the polyurethane is a flexible foam, the reaction and foaming are performed by the one shot technique, the polymer/polyol is a normally liquid, stable composition formed by polymerizing in the presence of a free radical catalyst, (1) from about 10 to about 50 weight percent of an ethylenically unsaturated monomer or monomers dissolved or dispersed in (2) from about 50 to about 90 weight percent of a polyol mixture comprising (a) a base polyol and (b) a connected branch polyol comprising a core segment having a number average molecular weight of at least about 240, one core branch unit directly connected to each end of said core segment, at least on additional branch unit at each end connected directly or indirectly to said core branch units, said branch units forming a branch unit segment, and linear polymer segments connected to said branch units and having a number average molecular weight of at least about 240, said connected branch polyol being present in an amount sufficient to stabilize the polymer/polyol, the blowing agent is water and is used in an amount to provide a foam having a density of about 3 pounds per cubic foot or less.

38. The method for producing the polyurethane of claim 35 wherein the connected branch polyol is present in an amount sufficient to stabilize the polymer/polyol and wherein the core segment comprises a polypropylene glycol residue.

39. The method for producing the polyurethane of claim 35 wherein the connected branch polyol is present in an amount sufficient to stabilize the polymer/polyol and wherein said branch units comprise a vicinal epoxide alcohol residue.

40. The method for producing the polyurethane of claim 39 wherein said vicinal expoxide alcohol is glycidol.

41. The method for producing the polyurethane of claim 35 wherein said connected branch polyol is present in an amount sufficient to stabilize the polymer/polyol and wherein said linear segment is formed from propylene oxide.

42. The method for producing the polyurethane of claim 41 wherein the number average molecular weight of said linear segments is at least about 1000.

43. The method for producing the polyurethane of claim 41 wherein said linear segments are capped with ethylene oxide.

44. The method for producing the polyurethane of claim 35 wherein said connected branch polyol is present in an amount sufficient to stabilize the polyol/polyol and wherein there are at least to additional branch units at each end.

45. The method for producing the polyurethane of claim 35 wherein said connected branch polyol is present in an amount sufficient to stabilize the polyol/polymer and wherein the branch unit segment density is 1.0.

46. The method for producing the polyurethane of claim 35 wherein said connected branch polyol is present in an amount sufficient to stabilize the polymer/polyol and wherein the branch unit segment density is less than 1.0.

47. The method for producing the polyurethane of claim 35 wherein said connected branch polyol is present in an amount sufficient to stabilize the polymer/ polyol and wherein said core segment is a polypropylene glycol residue, said branch units are a glycidol residue and said linear segments are formed from propylene oxide.

48. The method for producing the polyurethane of claim 47 wherein the branch unit segment density is 1.0.

49. The method for producing the polyurethane of claim 35 wherein said connected branch polyol is present in an amount sufficient to stabilize the polymer/polyol and wherein said ethylenically unsaturated monomer or monomers are members selected from the group consisting of acrylonitrile, styrene, methyl methacrylate, methacrylonitrile, methacrylic acid, methacrylamide, diethyl fumarate, p-chlorostyrene, vinyl acetate, vinyl ether, ethyl acrylate, vinyl anthracene-4, divinyl carbonate, maleimide, N-dimethyl acrylamide, butyl acrylate, vinyl anthracene-9, trimethylstyrene, trichloroethylene, vinyl chloride, vinylidene chloride, divinyl sulfone, vinyl versatate, vinyl bromide, isoprene, pentachloroPhenyl methacrylate, butadiene sulfone, N-t-butyl-acryl-amide and N-vinyl-2-pyrrolidinone.

50. The method for producing the polyurethane of claim 49 wherein the ethylenically unsaturated monomers are acrylonitrile and styrene in a weight ratio, respectively, of from about 0:100 to about 100:0.

51. The method for Producing the polyurethane of claim 50 wherein the weight ratio of acrylonitrile and styrene is about 35:65 or less.

52. The method for producing the polyurethane of claim 35 wherein the connected branch polyol is present in an amount sufficient to stabilize the polyol/polyol and wherein the ethylenically unsaturated monomer or monomers are present in an amount of at least about 35 weight percent.

* * * * *